(12) United States Patent
NepomucenoLeung et al.

(10) Patent No.: US 8,406,296 B2
(45) Date of Patent: Mar. 26, 2013

(54) VIDEO REFRESH ADAPTATION ALGORITHMS RESPONSIVE TO ERROR FEEDBACK

(75) Inventors: Nikolai Konrad NepomucenoLeung, Takoma Park, MD (US); Gurneen Kaur Khanuja, Indore (IN)

(73) Assignee: QUALCOMM Incorporated, San Diego, CA (US)

( * ) Notice: Subject to any disclaimer, the term of this patent is extended or adjusted under 35 U.S.C. 154(b) by 1003 days.

(21) Appl. No.: 12/349,386

(22) Filed: Jan. 6, 2009

(65) Prior Publication Data

US 2009/0252227 A1 Oct. 8, 2009

Related U.S. Application Data

(60) Provisional application No. 61/043,005, filed on Apr. 7, 2008.

(51) Int. Cl.
*H04N 11/02* (2006.01)
*H04N 7/12* (2006.01)

(52) U.S. Cl. ............................. 375/240.13; 375/240.27

(58) Field of Classification Search ........................ None
See application file for complete search history.

(56) References Cited

U.S. PATENT DOCUMENTS

| | | | |
|---|---|---|---|
| 2003/0152106 A1 | 8/2003 | Burmeister et al. | |
| 2006/0078051 A1 | 4/2006 | Liang et al. | |
| 2008/0095246 A1* | 4/2008 | Luo et al. ................. | 375/240.27 |
| 2009/0213940 A1* | 8/2009 | Steinbach et al. ....... | 375/240.27 |

FOREIGN PATENT DOCUMENTS

| | | |
|---|---|---|
| CN | 1551553 A | 12/2004 |
| CN | 1856112 A | 11/2006 |
| EP | 1337086 A1 | 8/2003 |
| JP | 04176291 | 6/1992 |
| JP | 10200897 A | 7/1998 |
| JP | 11289542 A | 10/1999 |
| JP | 2002330437 A | 11/2002 |
| JP | 2003244229 A | 8/2003 |
| JP | 2006319423 A | 11/2006 |
| JP | 2007535210 A | 11/2007 |

OTHER PUBLICATIONS

3GPP2: "Packet Switched Video Telephony Services (PSVT/MCS)" 3GPP2, C.S0055-0, Version 1.0, Dec. 2007, XP002542622 p. 32, paragraph 8-p. 33.
International Search Report and Written Opinion—PCT/US2009/039677—ISA/EPO—Sep. 4, 2009.

(Continued)

*Primary Examiner* — Marcus R Smith
(74) *Attorney, Agent, or Firm* — Brent A. Boyd

(57) ABSTRACT

In general, this disclosure relates to techniques for adaptively determining a rate for intra-coding segments (e.g., macroblocks) of video data within a sequence of video units (e.g., frames) in response to the receipt of error feedback that is provided by a video decoder. One example method includes receiving feedback from a video decoder that indicates an error associated with coded video data, and, upon receipt of the feedback, determining a rate for intra-coding a specified number of segments of video data for each video unit within a sequence of video units, wherein an intra-coding of segments of video data within one video unit is independent of a coding of segments of video data within other video units within the sequence.

50 Claims, 10 Drawing Sheets

OTHER PUBLICATIONS

Ott Helsinki University of Technology S Wenger Nokia N Sato Oki C Burmeister J Rey Matsushita J: "Extended RTP Profile for Real-time Transport Control Protocol (RTCP)-Based Feedback (RTP/AVPF); rfc4585.txt" IETF Standard, Internet Engineering Task Force, IETF, CH, Jul. 1, 2006, XP015055018 ISSN: 0000-0003 abstract p. 31, paragraph 6-p. 41.

Polycom E. R., "RTP Payload Format for H.261 Video Streams; rfc4587.txt", IETF Standard, Internet Engineering Task Force, IETF, CH, Aug. 1, 2006, XP015055020, ISSN: 0000-0003, p. 9, paragraph 5-p. 10.

3GPP TS 26.114 v1.2.0 (Dec. 13, 2006), "3rd Generation Partnership Project; Technical Specification Group Services and System Aspects-IP multimedia subsystem (IMS) multimedia telephony; media handling and interaction," (Release 7) TSG-SA4 internal working draft.

* cited by examiner

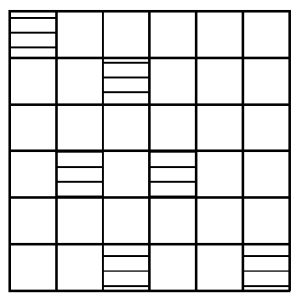
FIG. 3A
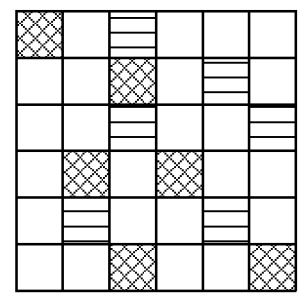
FIG. 3B
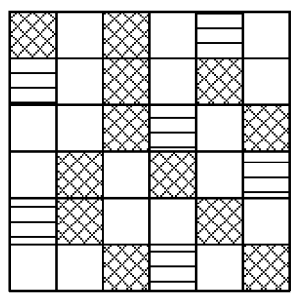
FIG. 3C
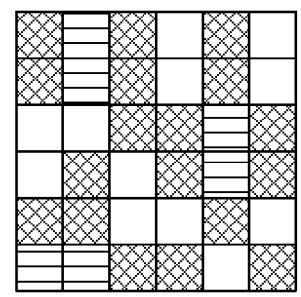
FIG. 3D
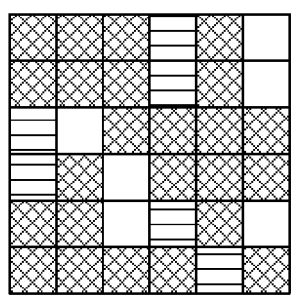
FIG. 3E
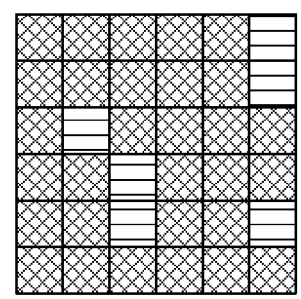
FIG. 3F
 Block not yet intra-coded — 100
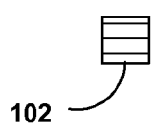 Block intra-coded in current frame — 102
 Block intra-coded in a prior frame — 104

VIDEO REFRESH ADAPTATION ALGORITHMS RESPONSIVE TO ERROR FEEDBACK

RELATED APPLICATION

This application claims the benefit of U.S. Provisional Application No. 61/043,005, filed on Apr. 7, 2008, the entire contents of which is incorporated herein by reference.

TECHNICAL FIELD

This disclosure relates to encoding and/or decoding of video data.

BACKGROUND

Video coding and compression techniques may achieve efficient compression by reducing both temporal redundancies between video frames in a frame sequence and also spatial redundancies within a video frame. Examples of video coding and compression techniques are described by the ITU-T H.261, H.263, Motion Picture Experts Group (MPEG) 1, MPEG2, and MPEG4 standards, as well as the ITU-T H.264 standard and its counterpart, ISO/IEC MPEG-4, Part 10, i.e., Advanced Video Coding (AVC).

An intra-coded frame is self-contained and reduces spatial redundancies within a video frame. An inter-coded frame, however, is predicted via motion compensation from other coded frames (e.g., previously coded frames) to reduce temporal redundancies. Inter-coding may achieve high compression efficiency. However, the inter-dependency between frames makes the coded bit-stream for inter-coded frames more susceptible to propagating channel errors. Errors introduced in the compressed bit-stream may result in errors in the video frames reconstructed by a video decoder.

Intra-coding may help minimize the possibility of propagating channel errors, because the coding of video data in these frames is independent of the coding of video data in previous or subsequent frames. However, intra-coded frames may comprise many times more coded data than inter-coded frames, and may therefore cause transmission bandwidth issues. As a result, there may be a degradation of quality on the decoded video output side, particularly when decoding is performed by real-time, or streaming, video applications. Thus, in some cases, video coding techniques may only intra-code individual segments (e.g., macro-blocks) of data within individual frames, rather than intra-coding all of the frame data.

Any given macro-block within an inter-coded frame (i.e., Predicted frame (P-frame) or Bi-directionally predicted frame (B-frame)) may be intra-coded as an intra macro-block. Similar to intra-coded frames, an intra-coded macro-block is coded independently of data from another (e.g., previously) coded frame. The method of forcing macro-blocks to be intra-coded may be referred to as encoder intra-refresh.

SUMMARY

In general, this disclosure relates to techniques for adaptively determining a rate for refreshing segments (e.g., macro-blocks) of video data within a sequence of video units (e.g., frames) in response to the receipt of error feedback provided by a video decoder. This error feedback may comprise packet loss feedback, indicating that the video decoder failed to receive packets within one or more frames of a frame sequence.

In some cases, the error feedback comprises a Picture Loss Indication (PLI) message and/or a General Negative Acknowledgment (GNACK) message that is sent by the video decoder. A PLI message indicates a loss of an undefined amount of coded video data belonging to one or more pictures, while a GNACK message may identify specific packets of coded video data that have been lost.

An error feedback algorithm may be implemented to set a macro-block intra-refresh rate by the video encoder based upon the error feedback that is received from the video decoder. The video encoder may then use this intra-refresh rate to intra-code one or more macro-blocks in each frame of a frame sequence.

In one aspect, a method comprises receiving feedback from a video decoder that indicates an error associated with coded video data, and, upon receipt of the feedback, determining a rate for intra-coding a specified number of segments of video data for each video unit within a sequence of video units, wherein an intra-coding of segments of video data within one video unit is independent of a coding of segments of video data within other video units within the sequence.

In one aspect, a computer-readable medium contains instructions for causing one or more processors to receive feedback from a video decoder that indicates an error associated with coded video data, and, upon receipt of the feedback, to determine a rate for intra-coding a specified number of segments of video data for each video unit within a sequence of video units, wherein an intra-coding of segments of video data within one video unit is independent of a coding of segments of video data within other video units within the sequence.

In one aspect, a device comprises a storage device and one or more processors coupled to the storage device and configured to receive feedback from a video decoder that indicates an error associated with coded video data, and, upon receipt of the feedback, to determine a rate for intra-coding a specified number of segments of video data for each video unit within a sequence of video units, wherein an intra-coding of segments of video data within one video unit is independent of a coding of segments of video data within other video units within the sequence.

In one aspect, a method comprises detecting, by a video decoder, at least one error associated with coded video data sent from a video encoder, determining a round-trip travel time for data communication between the video decoder and the video encoder, determining a last-sent time at which the video decoder last sent the video encoder a feedback message indicating a previous error that was detected by the video decoder, comparing a current time to a sum of the last-sent time and the round-trip travel time, and, based upon the comparing, determining whether to send the video encoder a second feedback message indicating the at least one error detected by the video decoder.

In one aspect, a device comprises a storage device and one or more processors coupled to the storage device. The one or more processors are configured to detect at least one error associated with coded video data sent from a video encoder, determine a round-trip travel time for data communication between the device and the video encoder, determine a last-sent time at which the device last sent the video encoder a feedback message indicating a previous error that was detected by the device, and compare a current time to a sum of the last-sent time and the round-trip travel time. Based upon the comparison, the one or more processors are further configured to determine whether to send the video encoder a second feedback message indicating the at least one error detected by the device.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages will be apparent from the description and drawings, and from the claims.

BRIEF DESCRIPTION OF DRAWINGS

FIGS. 3A-3F are diagrams illustrating a frame sequence, where a certain number of blocks are intra-coded within each frame of the sequence.

DETAILED DESCRIPTION

Figure 1:
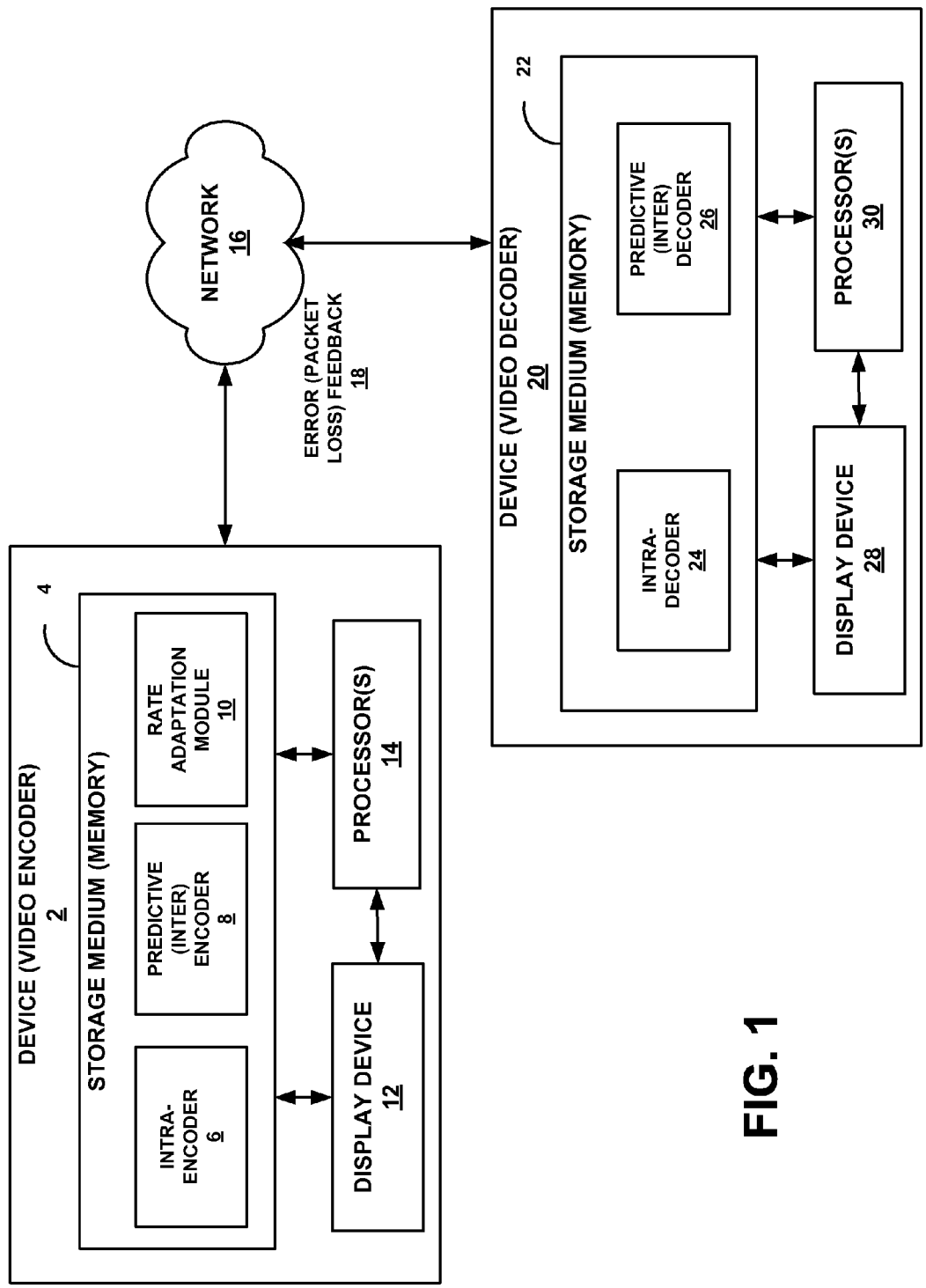
FIG. 1 is a block diagram illustrating a video encoder that is communicatively coupled to a video decoder via a network.

FIG. 1 is a block diagram illustrating an example device (video encoder) 2 that is communicatively coupled to a device (video decoder) 20 via a network 16. Video encoder 2 and video decoder 20 may comprise stand-alone devices or may be part of larger systems. For example, each of video encoder 2 and video decoder 20 may comprise, or be part of, a wireless communication device (such as a wireless mobile handset), a digital camera, a video camera, a video telephone, a digital multimedia player, a personal digital assistant (PDA), a video game console, a personal computer or laptop device, or other video device. Video encoder 2 and video decoder 20 may also each be included within one or more integrated circuits, or chips, which may be used in some or all of the devices described above. Network 16 may, in some cases, comprise a wired or a wireless network. In one aspect, network 16 may be a private or a public (e.g., Internet) network.

For purpose of illustration and description only, device 2 is referred to as a video encoder, and device 20 is referred to as a video decoder. In the description below, various techniques provides details on exchanges of information between a device that performs encoding (e.g., compression) and a device that performs decoding (e.g., decompression), and thus device 2 (video encoder) and device 20 (video decoder) are shown as being communicatively coupled via network 16. It should be understood, however, that, in certain aspects, device 2 and/or device 20 may perform encoding and/or decoding operations. However, it is assumed in the subsequent description, for illustration purposes only, that device 2 performs at least video encoding operations, and is therefore referred to as a video encoder, while device 20 performs at least video decoding operations, and is therefore referred to as video decoder.

In some cases, video encoder 2 and video decoder 20 may each be capable of executing various applications, such as graphics applications, video applications, and/or other multimedia applications. For example, video encoder 2 and video decoder 20 may be used for graphics applications, video game applications, video playback applications, digital camera applications, instant messaging applications, video teleconferencing applications, mobile applications, or video streaming applications.

Video encoder 2 and video decoder 20 may each be capable of processing a variety of different data types and formats. For example, they may be able to process still image data, moving image (video) data, or other multi-media data. As will be described in more detail below, video encoder 2 is capable, during an intra-refresh procedure, of intra-coding one or more segments (e.g., blocks or macro-blocks) or video data within one or more video units, such as video frames, within a sequence of video units to help reduce spatial redundancies within the sequence. Intra-coded segments are segments that are coded independently of video data from a previously or subsequently coded video unit.

Any given macro-block within an individual frame may be intra-coded as an intra macro-block. Similar to intra-coded frames, an intra-coded macro-block is coded independently of data from another (e.g., previously) coded frame. The method of forcing macro-blocks to be intra-coded may be referred to as encoder intra-refresh. The rate at which macro-blocks are intra-coded may be referred to as an intra-refresh rate. There may be various reasons for intra-refreshing macro-blocks, such as, for example, inverse discrete cosine transform (IDCT) mismatch control by video decoder 20, and error resilience.

To control IDCT mismatch, such as within the context of the H.261 and H.263 block-based video coding standards, each macro-block location in an image may be intra-coded at least once every pre-determined number of times that coefficients are transmitted for that macro-block. The intra-refresh of macro-blocks may limit the extent of error propagation due to DCT/IDCT mismatch.

To improve error resilience, selected macro-blocks may be intra-coded to limit error propagation resulting from using corrupt macro-blocks that have been incorrectly reconstructed or concealed due to channel errors. These corrupt macro-blocks may, upon decoding, be visually objectionable. Furthermore, correctly decoded macro-blocks from subsequent frames that refer back to a corrupt macro-block for temporal prediction may also be visually objectionable. These types of artifacts may be more objectionable than the DCT/IDCT mismatch errors. As such, they may drive an intra-refresh strategy when communicating data over error-prone channels.

Based upon error (packet loss) feedback 18 that is received from video decoder 20, video encoder 2 is capable of dynamically adjusting the rate of intra-refresh for intra-coded blocks. In such fashion, video encoder 2 is able to optimize the quality of, and reduce the number of errors in, video data transmission to video decoder 20, yet also manage the transmission bandwidth by controlling the number of intra-coded blocks that are sent to video decoder 20 over time. In some aspects, feedback 18 may include indications regarding any number of different types of packet errors associated with coded video data, including indications of packet loss. For purposes of illustration only, it will be assumed in the following description that feedback 18 relates to packet loss feedback.

Figure 2:
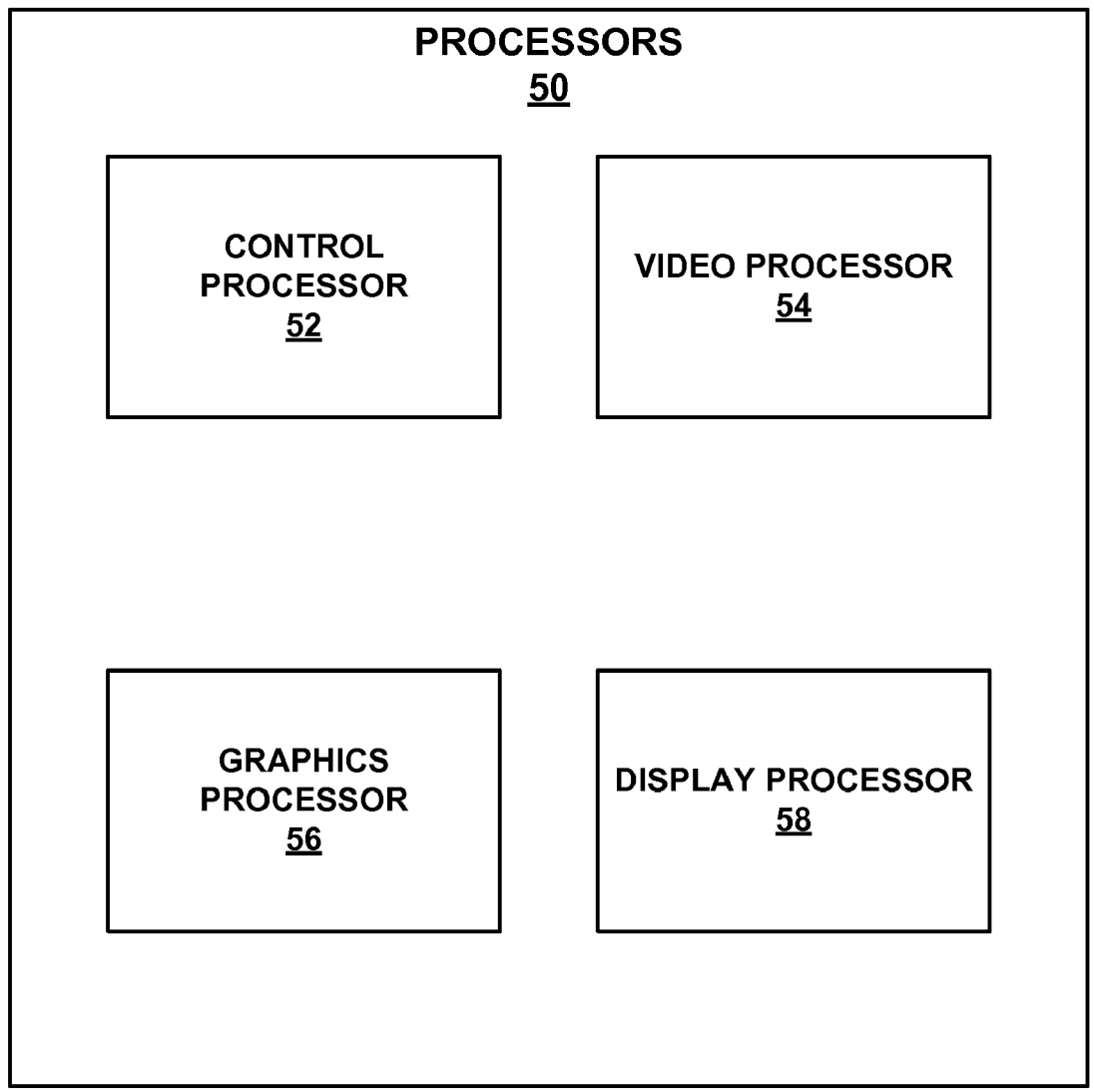
FIG. 2 is a block diagram illustrating example processors that may be included within the video encoder and/or video decoder shown in FIG. 1.

Video encoder 2 includes a storage medium 4, a display device 12, and one or more processors 14. Storage medium 4 may include any permanent or volatile memory that is capable of storing instructions and/or data, such as, for example, synchronous dynamic random access memory (SDRAM), read-only memory (ROM), non-volatile random access memory (NVRAM), embedded dynamic random access memory (eDRAM), static random access memory (SRAM), or flash memory. Display device 12 may be any device capable of displaying video data for display purposes, such as an LCD (liquid crystal display), plasma display device, or other television (TV) display device. Processors 14 may include one or more processors, such as a control processor, a video processor, a graphics processor, and/or a display processor, such as is shown in the example of FIG. 2. Display device 12 and processors 14 are each capable of reading from and writing to storage medium 4. For example, processors 14 may execute instructions from one or more functional modules that are stored in storage medium 4. These modules may comprise downloadable modules that are downloaded dynamically, over the air, into storage medium 4. In one aspect, one or more of these modules may comprise binary instructions that are generated or compiled from application programming interface (API) instructions created by an application developer.

FIG. 1 shows an example of three such modules stored within storage medium 4, each of which may comprise one or more instructions, or code, for execution. As seen in FIG. 1, storage medium 4 stores instructions for an intra-encoder 6, a predictive (inter) encoder 8, and a rate adaptation module 10. Intra-encoder 6 is capable, upon execution, of intra-coding one or more segments (e.g., blocks) of video data within one or more video units (e.g., frames). Intra-coding performed by intra-encoder 6 may comprise independent coding that is not based on a coding of data segments contained within other video units within a sequence of video units. Predictive encoder 8 is capable of inter-coding one or more segments of video data to reduce temporal redundancies across video units. Inter-coding may implement predictive techniques to encode video data based upon motion compensation from previously or subsequently coded frames. Rate adaptation module 10 is capable of receiving and processing packet loss feedback 18, which is provided by video decoder 20, to determine (e.g., set, modify) the rate of intra-coding (or the intra-refresh rate) implemented by intra-encoder 6.

Although the example of FIG. 1 shows intra-encoder 6, predictive encoder 8, and rate adaptation module 10 as modules stored within storage medium 4 and executable by processors 14, these modules may, in other cases, be implemented within hardware (such as within the hardware of processors 14). Processors 14 may, in some cases, include one or more types of processors, such as a general purpose microprocessor and/or other types of processors, such as shown in the example of FIG. 2.

Over time, video encoder 2 sends coded video data to video decoder 20 for decoding and display. If video decoder 20 determines that it has lost one or more packets of video data (such as by tracking packet sequence numbers), it may send an indication that it has lost coded video data to video encoder 2. In FIG. 1, this indication comprises packet loss feedback 18. In some cases, packet loss feedback 18 may include Real-Time Control Protocol (RTCP) data or messages. For example, packet loss feedback 18 may include one or more General Negative Acknowledgment (GNACK) messages that each may identify one or more packets, such as packets that have been lost. Packet loss feedback 18 may include one or more Picture Loss Indication (PLI) messages, which generally indicate the loss of an undefined amount of coded video data belonging to one or more pictures. In some cases, packet loss feedback 18 may include one or more Real-Time Transport Protocol (RTP) messages, such as receiver report messages, that may also provide information regarding packet loss.

In the example of FIG. 1, video decoder 20 includes a storage medium 22, a display device 28, and one or more processors 30. Similar to storage medium 4, storage medium 22 may include any permanent or volatile memory that is capable of storing instructions and/or data, such as, for example, synchronous dynamic random access memory (SDRAM), read-only memory (ROM), non-volatile random access memory (NVRAM), embedded dynamic random access memory (eDRAM), static random access memory (SRAM), or flash memory. Similar to display device 12, display device 28 may be any device capable of displaying video data for display purposes, such as an LCD (liquid crystal display), plasma display device, or other television (TV) display device. Processors 30 may include one or more processors, such as a control processor, a video processor, a graphics processor, and/or a display processor. Display device 28 and processors 30 are each capable of reading from and writing to storage medium 22.

As shown in FIG. 1, storage medium 22 may include instructions for two functional modules: an intra-decoder 24 and a predictive (inter) decoder 26. Intra-decoder 24 is capable of decoding and display intra-coded segments (e.g., blocks) of video data contained within one or more video units (e.g., frames) that are sent across network 16 by video encoder 2. Predictive decoder 26 is capable of decoding and displaying inter-coded segments that are sent by video encoder 2. Processors 30 may execute these modules 24 and 26 to display video data on display device 28. Although the example of FIG. 1 shows intra-decoder 24 and predictive decoder 26 as modules stored within storage medium 22 and executable by processors 30, these modules may, in other cases, be implemented within hardware (such as within the hardware of processors 30). Processors 30 may, in some cases, include one or more types of processors, such as a general purpose microprocessor and/or other types of processors, such as shown in the example of FIG. 2.

In some cases, video decoder 20 is further capable of performing encoding operations. In these cases, video decoder 20 may include modules similar to intra-encoder 6, predictive encoder 8, and rate adaptation module 10. In some cases, video encoder 2 is further capable of performing decoding operations, such as when receiving coded video data from device 20 (which may perform both decoding and encoding operations). In these cases, video encoder 2 may include modules similar to intra-decoder 24 and predictive decoder 26.

FIG. 2 is a block diagram illustrating example processors 50 that may be included within video encoder 2 and/or video decoder 20 shown in FIG. 1, according to one aspect. When included within video encoder 2, processors 50 shown in FIG. 2 may be part of processors 14. When included within video decoder 20, processors 50 may be part of processors 30. Processors 14 and processors 30 may each include one or more processors, and may, in some cases, include one or more of the processors shown in the example of FIG. 2.

Processors 50 may comprise multiple programmable processors. As shown in FIG. 2, these may include a control, or general-purpose, processor 52, a video processor 54, a graphics processor 56, and a display processor 58. Control processor 52 may be capable of controlling video processor 54, graphics processor 56, and/or display processor 58. In one aspect, processors 50 may include other forms of multi-media processors.

Video processor 54 may be utilized during video encoding and/or decoding operations, and may implement various coding algorithms. For example, video processor 54 may implement, in some cases, H.261, H.263, Motion Picture Experts Group (MPEG) 1, MPEG2, and/or MPEG 4 video coding standards, as well as the H.264 standard and its counterpart, ISO/IEC MPEG-4, Part 10, i.e., Advanced Video Coding (AVC). Video processor 54 may also implement one or more discrete cosine transform (DCT) or inverse discrete cosine transform (IDCT) operations when encoding or decoding video data.

Graphics processor 56 may be a dedicated graphics rendering device utilized to render, manipulate, and display computerized graphics. Graphics processor 56 may implement various complex graphics-related algorithms. For example, the complex algorithms may correspond to representations of two-dimensional or three-dimensional computerized graphics. Graphics processor 56 may implement a number of so-called "primitive" graphics operations, such as forming points, lines, and triangles or other polygon surfaces, to create complex, three-dimensional images on a display, such as display device 12 or 28 (FIG. 1). Display processor 58 manages the display of pixel data on the display device. Display device 58 may perform various operations on the pixel data, such as rotation and/or scaling operations.

FIGS. 3A-3F are diagrams illustrating a frame sequence, where a certain number of blocks are intra-coded within each frame of the sequence, according to one aspect. These diagrams show segments of video data as blocks (e.g., macro-blocks), but segments of any size or shape of video data could be used. The blocks may comprise macro-blocks, such as 16×16 pixel macro-blocks, for example, or may, in some cases, comprise small sub-partitions (16×8, 8×16, 8×8, 4×8, 8×4, 4×4, etc.) pixel blocks.

In the example of FIGS. 3A-3F, it is assumed that an example frame sequence includes six frames that follow one another consecutively in a temporal sequence. (Of course, in other cases or examples, a frame sequence may include many more than six frames.) Each frame may include an array of blocks arranged at different positions. Each of FIGS. 3A-3F shows one of these six frames for purposes of illustration. Video encoder 2 (FIG. 1) is capable of coding (e.g., intra-coding and/or inter-coding) blocks of the video data within each frame and sending the frame to video decoder 20 for decoding and display. Video encoder 2 may use its predictive encoder 8 to inter-code one or more blocks of video data within any given frame, and may use its intra-encoder 6 to intra-code one or more blocks of video data within any given frame. Video encoder 2 may use its rate adaptation module 10 to adjust the rate of intra-coding (i.e., intra-refresh rate) of blocks, or the number of intra-coded blocks in each frame.

In FIGS. 3A-3F, each of the temporally consecutive frames includes six intra-coded blocks 102. FIGS. 3A-3F also depict blocks that are not yet intra-coded 100, and also previously intra-coded blocks 104. Any blocks that are not intra-coded within a given frame may, in some cases, be inter-coded. However, as can be seen in the six-frame sequence of FIGS. 3A-3F, if no blocks are intra-coded twice (because each block may be unique, as is the case in this example), then all of the blocks will be intra-coded once in the six-frame sequence. It should be noted that, in this example, the same number of blocks (six) are intra-coded in each frame, but this is not necessary. The blocks that are not intra-coded in each frame may be inter-coded, and may reference one or more frames where a corresponding best-matching block is intra-coded or inter-coded.

Because, in FIGS. 3A-3F, only six blocks are intra-coded in each frame of the sequence, it takes six frames to complete the intra-coding of each block at all positions in the entire frame. However, there may be interdependency between frames, given that other blocks are inter-coded, meaning that coded bit streams may be susceptible to propagating channel errors, which may result in errors within the video frames decoded by video decoder 20. Increasing the number of intra-coded blocks in each transmitted frame may reduce errors and error propagation caused by channel errors. However, increasing the number of intra-coded blocks in each frame may also increase transmission bandwidth, given that more bits may be used for intra-coding than for inter-coding.

Thus, rate adaptation module 10 of video encoder 2 may dynamically determine, or adjust, the rate of intra-coding that is performed by intra-encoder 6. For example, rate adaptation module 10 may determine the number of intra-coded blocks for each frame in the sequence, and thus may increase or decrease this number in an attempt to balance the bandwidth and error reduction parameters. As previously described, rate adaptation module 10 may determine the intra-refresh rate based, in some cases, upon packet loss feedback 18 that is received from video decoder 20. For example, if video decoder 20 indicates that there is a significant amount, or increase, in packet losses or errors, rate adaptation module 10 may determine to increase the intra-refresh rate to help reduce the possibility of further propagating errors. This will be described in more detail below.

Figure 4:
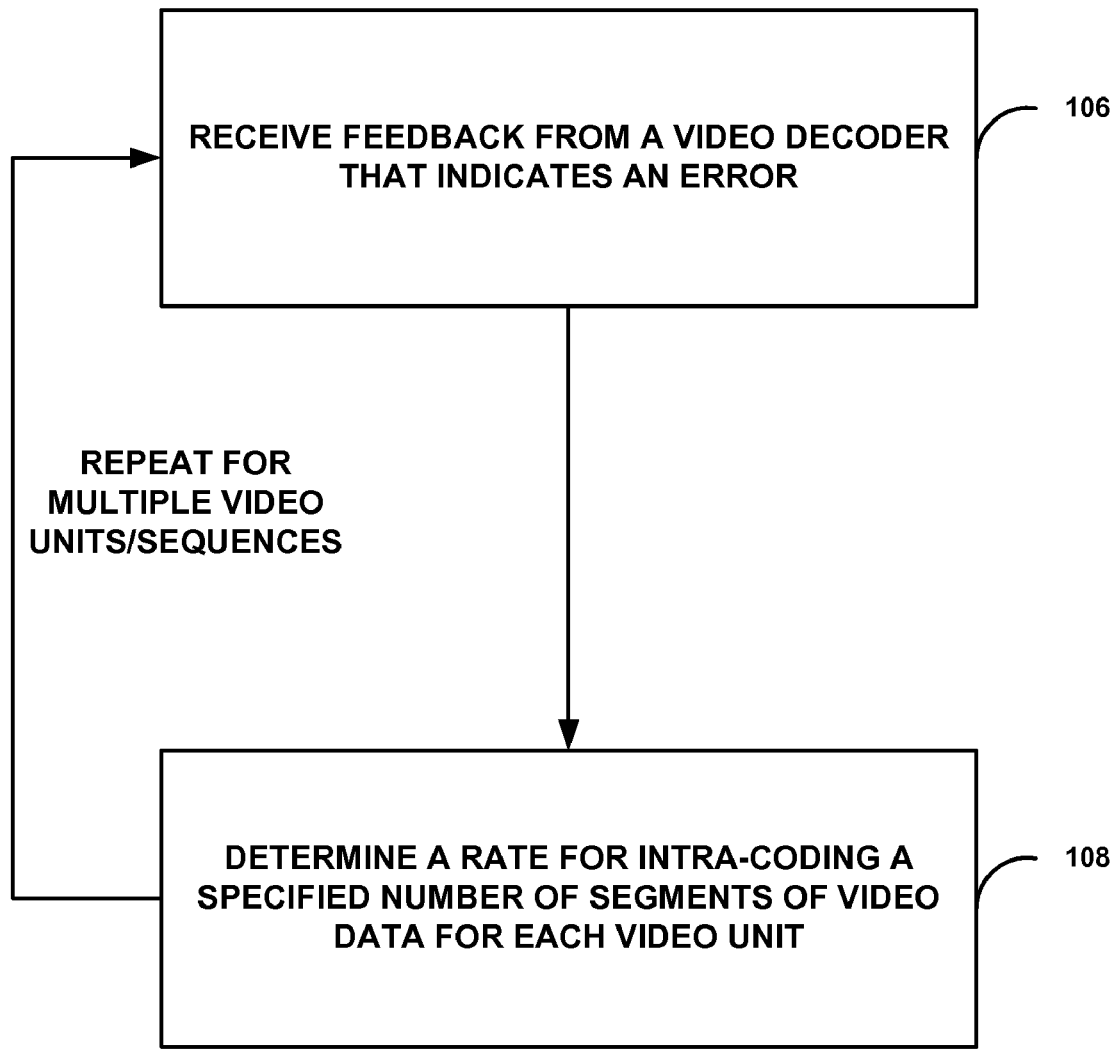
FIG. 4 is a flow diagram illustrating a method that may be performed by a video encoder to determine a rate for intra-coding segments of video data based upon received error feedback.

FIG. 4 is a flow diagram illustrating a method that may be performed by a video encoder, such as video encoder 2 shown in FIG. 1, to determine a rate for intra-coding segments of video data based upon received error feedback, such as error feedback 18, according to one aspect. FIG. 4 shows the details of a high-level method that may be implemented by a video encoder, and further details of various aspects are also shown in subsequent figures, such as FIGS. 5-8. In the following description of FIG. 4, it will be assumed that the method is performed by video encoder 2 for purposes of illustration only.

Video encoder 2 may receive feedback 18 from video decoder 20 that indicates an error (e.g., loss of data) associated with coded video data, such as coded video data that may have been previously sent by video encoder 2 to video decoder 20 (106). Upon receipt of feedback 18, video encoder 2 may determine a rate for intra-coding a specified number of segments (e.g., blocks) of video data for each video unit within a sequence of video units (e.g., frames), wherein an intra-coding of segments of video data within one video unit is independent of a coding of segments of video data within other video units within the sequence (108). Video encoder 2 may repeat the acts of processing received feedback 18 and determining a rate for intra-coding for multiple video units and/or sequences of video units.

In some cases, feedback 18 that is sent from video decoder 20 indicates a loss of at least a portion of the coded video data by video decoder 20. Each segment of video data may comprise one or more blocks of video data, and each video unit within the sequence of video units may comprise one or more frames or slices of video data. An intra-coding of blocks of video data within one frame may be independent of a coding of blocks of video data within other frames within the sequence.

Feedback 18 may, in one aspect, comprise at least one of a picture loss indication (PLI) and a general negative acknowledgment (GNACK). Feedback 18 may comprise feedback indicating a number of lost packets containing coded video data, each lost packet having been previously sent to, but not received by, video decoder 20 by video encoder 2. In some cases, determining the rate for intra-coding may be based, at least in part, on a target correction time for correcting errors across one or more video units within the sequence, as will be described in further detail below.

When feedback 18 includes a GNACK that indicates a number of lost packets, determining the rate for intra-coding may be based, at least in part, on the number of lost packets. In some cases, video encoder 2 may also receive a report from video decoder 20 indicating a second number of lost packets. For example, this report may be one of a series of RTCP Receiver Reports periodically sent by video decoder 20 to video encoder 2. As will be described in further detail below, video encoder 2 may, in one aspect, calculate a packet error rate based upon at least one of the number of lost packets indicated by the GNACK and the second number of lost packets indicated by the report, wherein determining the rate for intra-coding is based, at least in part, on the packet error rate. For example, video encoder 2 may calculate a packet error rate based upon which of the GNACK or report indicates a higher volume of lost packets. Determining the rate of intra-coding may be further based, at least in part, on an estimated number of packets contained within each video unit within the sequence of video units.

If error feedback 18 includes a GNACK message, the GNACK may identify each lost packet, and video encoder 2 may calculate an elapsed time based upon a difference between a current time and a time at which one of the identified lost packets was previously sent to video decoder 20, as is described in further detail below in reference to FIG. 8. Video encoder 2 may determine the rate of intra-coding based, at least in part, on this elapsed time. In some cases, each lost packet identified by the GNACK has an associated sequence number. Sequence numbers may be initially assigned to packets, in ascending order, when the packets are sent from video encoder 2 to video decoder 20. Video decoder 20 may keep track of which packets it has received, and also the corresponding sequence numbers of these packets. Thus, the GNACK sent by video decoder 20 may identify the sequence numbers of any lost packets (or sequence number ranges for lost packets), assuming the sequence numbers are in ascending order.

Upon receipt of a GNACK that identifies lost packets by sequence number, video encoder 2 may calculate the elapsed time. Video encoder 2 may determine which lost packet identified by the GNACK has a sequence number that is greater than a sequence number of a first packet of a prior sequence of video units having intra-coded segments that was previously sent by video encoder 2 to video decoder 20. Video encoder 2 may then calculate the elapsed time based upon a difference between the current time, as maintained by video encoder 2, and a time at which the determined lost packet was previously sent to video decoder 20 from video encoder 2, as is described in more detail with reference to FIG. 8. Video encoder 2 may make such a calculation of the elapsed time by keeping track of when each packet, as identified by sequence number, was sent to video decoder 20.

As described above, video encoder 2 may repeat the receiving of feedback 18 and the determining of the rate for intra-coding for each video unit in multiple sequences of video units. In some cases, video encoder 2 may determine whether to repeat the processing of received feedback 18 and the determining of the rate for intra-coding in multiple sequences of video units based upon whether a detected amount of motion across different video units within one sequence of video units exceeds a motion threshold, as is described in further detail below. In one aspect, the motion threshold is an adjustable parameter that may, in some cases, be set to a higher threshold value by video encoder 2 when video encoder 2 uses a higher rate of intra-coding segments of video data.

Figure 5:
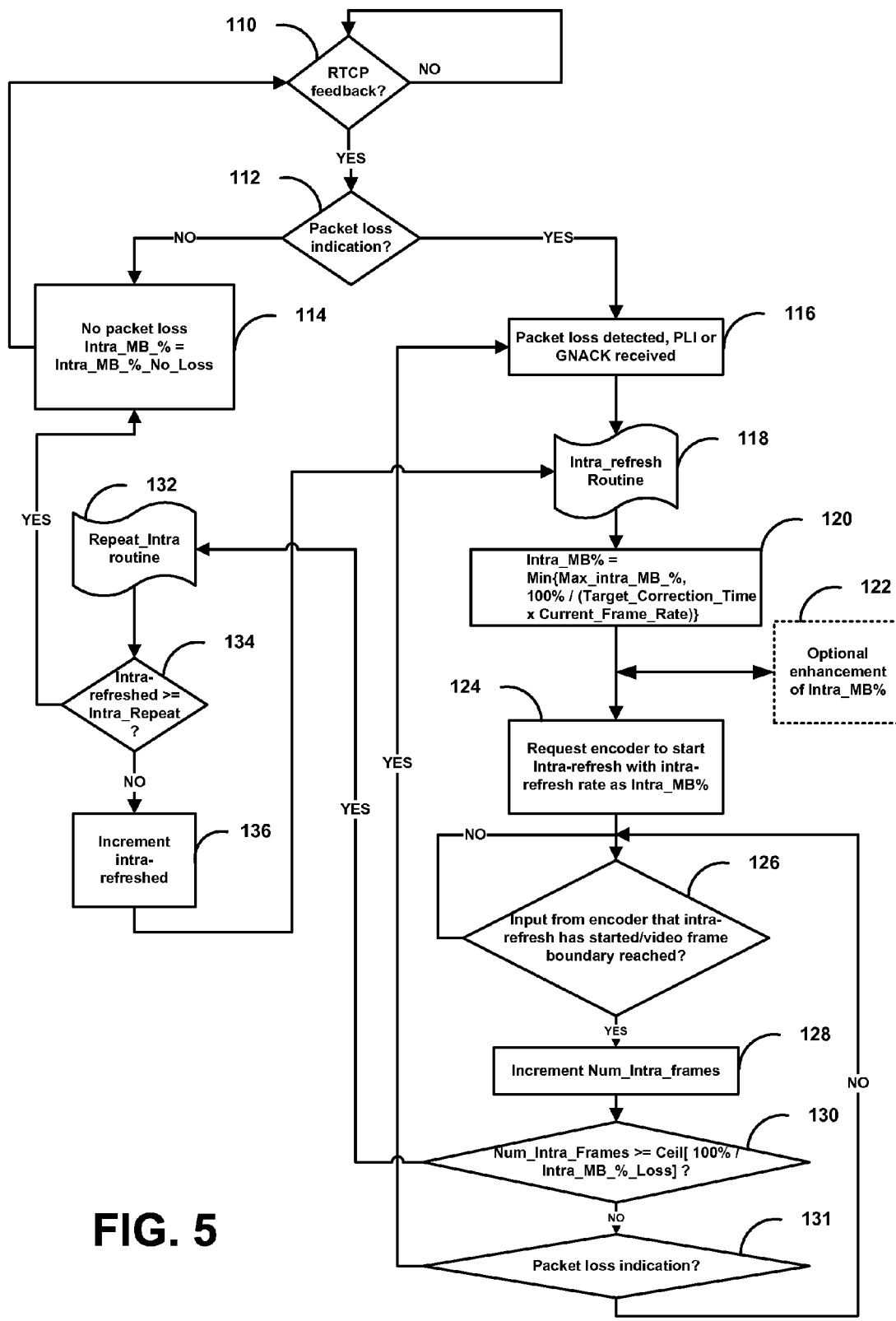
FIG. 5 is a flow diagram illustrating a method that may be performed by a video encoder to determine an intra-refresh rate for intra-coding blocks of video data based upon received packet loss information.

FIG. 5 is a flow diagram illustrating a method for determining an intra-refresh rate for intra-coding blocks of video data based upon received packet loss information, according to one aspect. Although the example of FIG. 5 refers to blocks, or macro-blocks, of video data, various other segments (sizes, shapes) of video data may be intra-coded in various other scenarios. In one aspect, the method shown in FIG. 5 may be performed by video encoder 2 (FIG. 1) based upon packet loss feedback 18 that is received from video decoder 20.

In various scenarios, video encoder 2 (and, more particularly, rate adaptation module 10) may determine a macro-block intra-refresh rate based upon received packet loss feedback, and may use various criteria or factors to calculate the intra-refresh rate. For example, as will be described in further detail, video encoder 2 may use a target correction time, a probability of uncorrected errors, a number of errors detected, an amount of motion, and/or a limited duration of user-perceived error when calculating an intra-refresh rate.

Various parameters are described with reference to FIG. 5 and subsequent flow diagrams. Some of these parameters are defined below:

Target_Correction_Time (in seconds): maximum amount of time after detection of an error by video encoder 2, such as a packet loss, for which the video encoder 2 has to correct the error.

Current_Frame_Rate (in frames per second): the current number of frames per second used by video encoder 2. If the video encoder 2 varies this parameter with changes in the target_enc_rate (targert encode rate) parameter, then the rate adaptation module 10 may estimate this from delivery of frames from the video encoder 2. In some cases, the video encoder 2 may indicate the value of Current_Frame_Rate to the rate adaptation module 10.

Max_Intra_MB_% (0-100%): maximum allowable percentage of intra-coded macro-blocks. This parameter may be used to limit degradation in video quality since the frame size may be fixed according to data and frame rate.

Intra_Repeat (integer): number of times a full macro-block intra-refreshed sequence (across a sequence of frames) is to be performed across the entire image when a packet loss is detected.

Intra_MB_%_No_Loss (0-100%): percentage of intra-coded (refreshed) macro-blocks when there is no detected packet loss.

Intra_MB_% (0-100%): the percentage of intra-coded (refreshed) macro-blocks that the video encoder 2 is to insert per frame (or slice).

Num_Intra_Frames (integer): the number of frames that the video encoder 2 has intra-coded (refreshed) macro-blocks.

In addition, various formulas and calculations that are shown below include Max and Min operations. It is assumed that a Max operation selects the maximum value of two or more possible values within a set, and that a Min operation selects the minimum value of two or more possible values within a set.

The method shown in FIG. 5 repeatedly checks to determine whether video encoder 2 has received RTCP feedback from video decoder 20 (110). Upon receipt of such feedback, video encoder determines whether the feedback indicates a loss of one or more packets that were transmitted by video encoder 2 to video decoder 20 (112). For example, packet loss feedback 18 (FIG. 1) sent by video decoder 20 to video encoder 2 may indicate such a loss of one or more packets of coded video data sent by video encoder.

If video encoder 2 has not received any packet loss indication, it may use rate adaptation module 10 to determine, or set, an intra-refresh rate, or percentage, for the macro-blocks (Intra_MB_%) equal to Intra_MB_%_No_Loss, which may comprise an adjustable parameter (114). In some cases, video encoder 2 may automatically set or adjust Intra_MB_%_No_Loss. In some cases, a user may set or adjust this parameter, such as to increase or decrease the number of intra-coded macro-blocks in each frame.

If, however, video encoder 2 has received a packet loss indication, such as packet loss feedback 18, it may determine whether it has received a GNACK or a PLI (116). A GNACK may indicate one or more specific packets that were lost, or that had errors. The Intra_refresh routine begins upon receipt of a packet loss indication (118).

Initially, rate adaptation module 10 of video encoder 2 may set (120) Intra_MB_% equal to $$\mathrm{Min}\{\mathrm{Max\_Intra\_MB\_\%}, 100\%/(\mathrm{Target\_Correction\_Time} \times \mathrm{Current\_Frame\_Rate})\}.$$

Max_Intra_MB_% and Target_Correction_Time are each adjustable parameters that may have initial, predefined values that are optimized for the particular application or operations that are performed by video encoder 2. These parameters may also have different values for different applications (e.g., video telephony, video streaming, gaming) that are executed by video encoder 2. Rate adaptation module 10 uses the values of each of these parameters when determining the value of Intra_MB_%.

Figure 6:
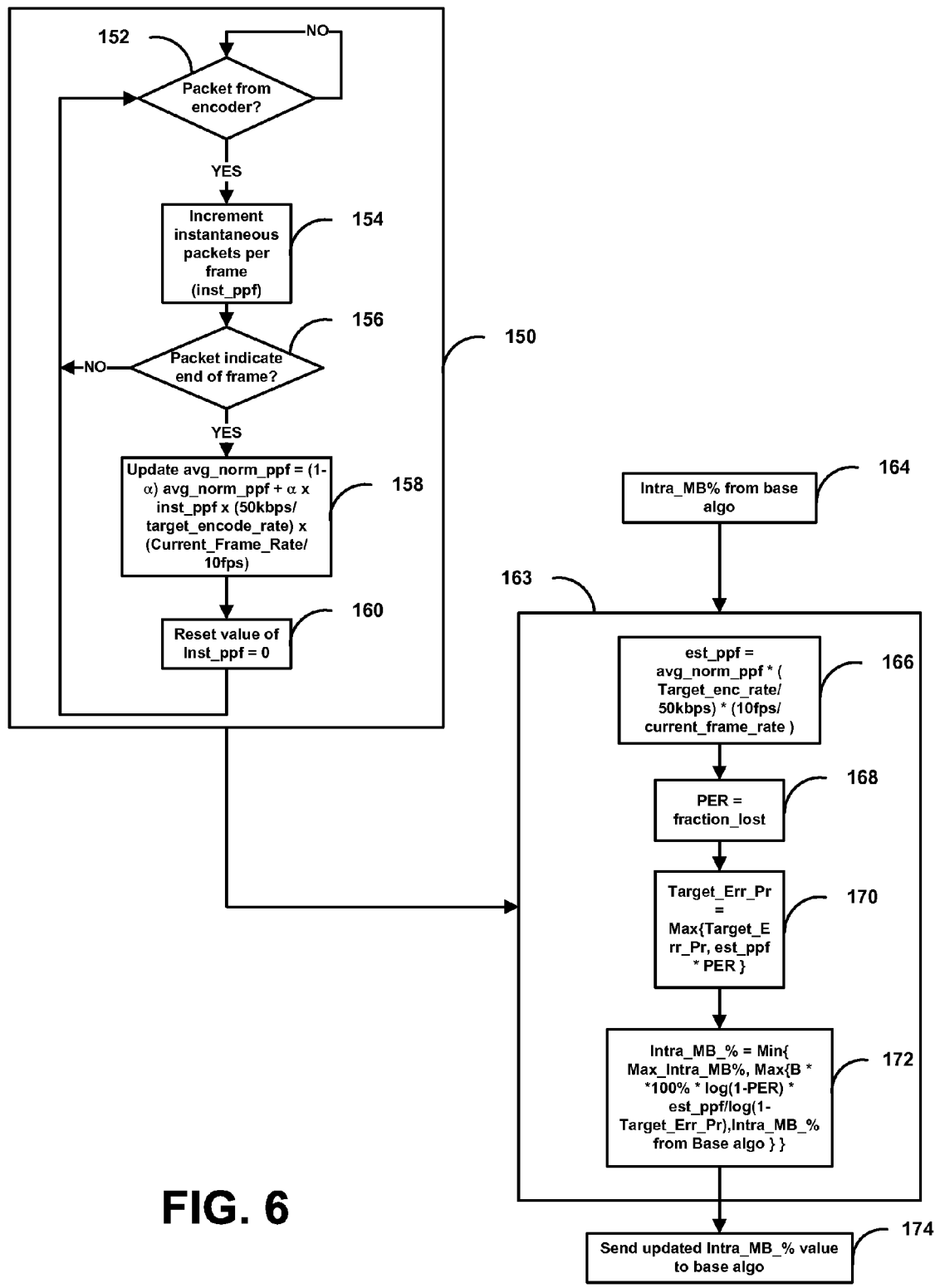
FIG. 6 is a flow diagram of a method that may be performed by a video encoder to obtain a modified value of the intra-refresh rate determined by the method of FIG. 5.
Figure 7:
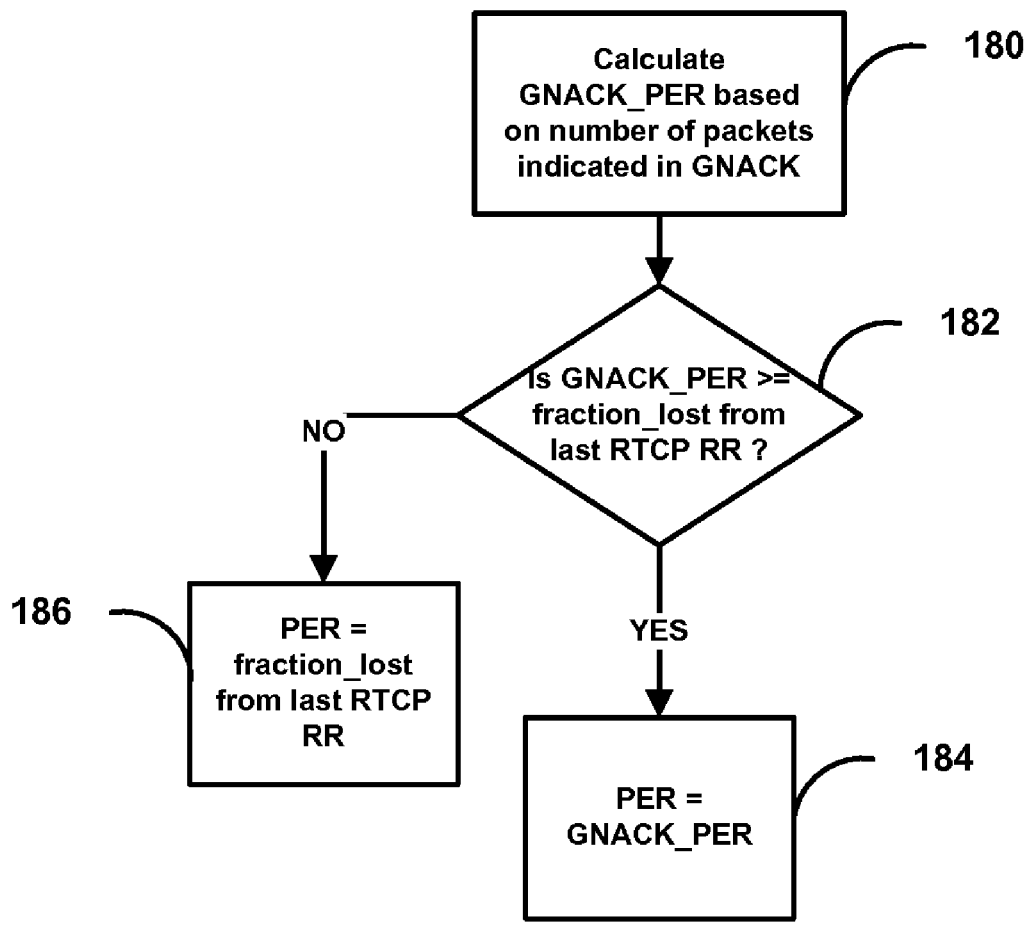
FIG. 7 is a flow diagram of a method that may be performed by a video encoder to calculate a packet error rate upon receipt of a General Negative Acknowledgment (GNACK) message.
Figure 8:
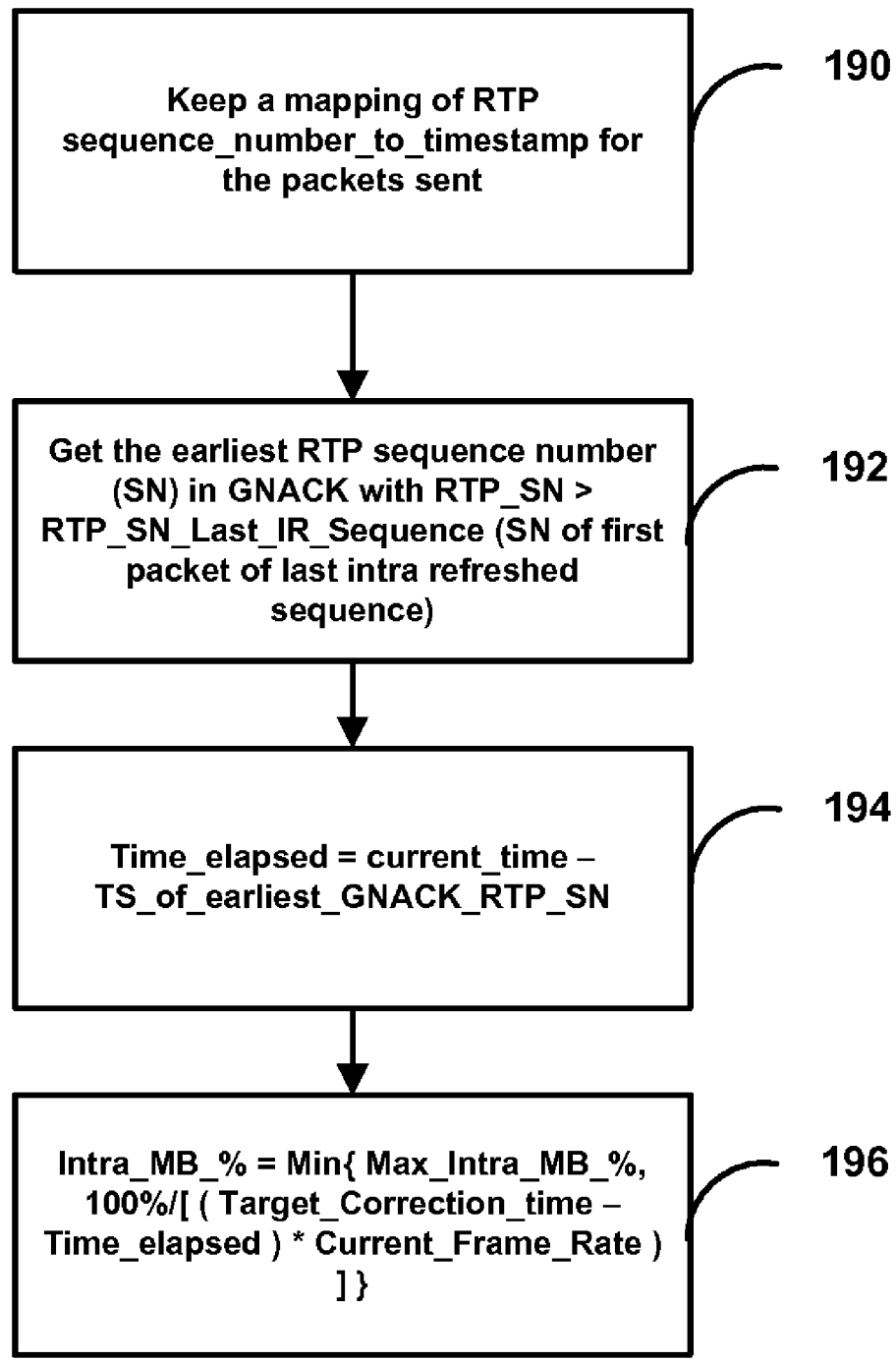
FIG. 8 is a flow diagram illustrating a method that may be performed by a video encoder to determine a modified intra-refresh rate based upon receipt of a GNACK message that includes packet sequence numbers.

In some cases, rate adaptation module 10 may implement one or more optional enhancement functions, such as are shown in FIGS. 6-8, to obtain a modified value of Intra_MB_% (122), as will be described in more detail below. Rate adaption module 10 requests video encoder 2 to start an intra-refresh procedure for a sequence of video frames using Intra_MB_% as the intra-refresh rate for macro-blocks in each frame, such as by executing intra-encoder 6 and predictive encoder 8 (124). Video encoder 2 also may initialize the value of Num_Intra_frames to zero. Input is then provided by video encoder 2 that the intra-refresh procedure has started. Video encoder 2 also indicates when each video frame boundary has been reached (126). This may be part of the same indication that is used to set a timestamp and/or market bit in RTP. When a video frame boundary has been reached, rate adaptation module 10 increments Num_Intra_Frames (128) which is a parameter that keeps track of the number of video frames that include intra-coded macro-blocks using the current value of Intra_MB_%.

At each frame boundary, rate adaptation module 10 determines (130) whether $$\mathrm{Num\_Intra\_Frames} \geq \mathrm{Ceil}[100\%/\mathrm{Intra\_MB\_\%}].$$

If Num_Intra_Frames is less than this ceiling (or maximum threshold), then video encoder 2 checks to determine whether it has received another packet loss indication from video decoder 20 (131). If not, video encoder 2 again checks for a video frame boundary (126). If, however, video encoder 2 has received another packet loss indication from video decoder 20, such as packet loss feedback 18, video encoder 2 may determine whether it has received a GNACK or a PLI (116). In this case, video encoder 2 then continues with the Intra_refresh routine (118).

If Num_Intra_Frames is greater than or equal to this ceiling, video encoder 2 has sent a full sequence of video frames to video decoder 20 using the current value of Intra_MB_% for each frame within this sequence (whereby an indicated number of macro-blocks in each frame have been intra-coded). Rate adaptation module 10 then performs the Repeat intra routine shown in FIG. 5 (132). In this routine, rate adaptation module 10 determines whether the number of times that video encoder 2 has intra-refreshed an entire sequence of video frames (Intra-refreshed) is greater than, or equal to, the value of Intra_Repeat (which is another adjustable parameter that may have an initial value of two) (134). The value of intra_Repeat may be adjusted to account for possible motion associated with one or more macro-blocks within an intra-refreshed frame sequence. Such motion may potentially result in errors that can be corrected by repeating the intra-refresh sequence for a video sequence one or more times.

Rate adaptation module 10 returns to a no-loss-detected operation, and sets Intra_MB_%=Intra_MB_%_No_Loss, when the number of times that a complete intra-refresh sequence has been performed (intra-refreshed) is greater than, or equal to, the value of Intra_Repeat. If, however, intra-refreshed is less than the value of Intra_Repeat, then rate adaptation module 10 increments the value of Intra-refreshed (136) and again performs the Intra_refresh routine (118) for a subsequent sequence of video frames, as is shown in FIG. 5.

FIG. 6 is a flow diagram of a method that may be performed by video encoder 2, shown in FIG. 1, to obtain a modified value of Intra_MB_%. This modified value of Intra_MB_% may be used within the method of FIG. 5, as specified within the box "Optional enhancement of Intra_MB_%" (122) in FIG. 5. In one aspect, video encoder 2 may perform the method shown in FIG. 5 to calculate an initial value of Intra_MB_%, but may then additionally perform the method shown in FIG. 6 to determine a modified value of Intra_MB_% for use when intra-coded macro-blocks within each video frame of a frame sequence.

By performing the method shown in FIG. 6, video encoder 2 may limit the probability of having uncorrected errors after one intra-refresh sequence of intra-coded macro-blocks within the frame sequence. Rate adaptation module 10 may determine a modified value of Intra_MB_% based, at least in part, on an estimate of an RTP packet loss rate during the intra-refresh sequence, and may make use of the fraction_lost parameter that is included within an RTCP Receiver Report that is provided by video decoder 20, indicating the fraction of packets that have been lost by video decoder 20 since the last Receiver Report was sent.

In addition, rate adaptation module 10 may be able to increase the value of Intra_MB_% when it has detected a larger number of errors (e.g., packet losses) from video decoder 20. By doing so, video encoder 2 may be able to more quickly correct errors that may be seen by the user of video decoder 20 (as displayed on display device 28).

Various parameters are described with reference to FIG. 6 and subsequent flow diagrams. Some of these parameters are defined below:

Target_Err_Pr (0-1): target probability that there will still be an error in the image after a single intra-refresh sequence (i.e., sequence of video frames). In the example of FIG. 6, this parameter is set higher than an expected PER (packet error rate) times the number of packets per frame.

$\alpha$ (0-1): IIR (infinite impulse response) filter update factor for estimating avg_norm_ppf (average normalized packets per frame). Video encoder 2 may start with a value of 0.1.

$\beta$ (0-10): tuning factor for determining Intra_MB_%. Video encoder 2 may start with a value of 1.0.

PER (0-1): packet error rate, which may be set equal to the fraction_lost parameter from the most recent RTCP Receiver Report received from video decoder 20.

avg_norm_ppf (real number): average 'normalized' packets per frame, which may be normalized to a target encode rate of 50 kbps (kilobits per second) and 10 fps (frames per second).

inst_ppf (integer): packets per frame in current frame est_ppf (real number): estimated number of packets per future frame Target_enc_rate (bits per second): current value of target_encode_rate set by rate adaptation module 10.

As is shown in FIG. 6, video encoder 2 may calculate, or estimate, the value of avg_norm_ppf (150) when calculating a modified value of Intra_MB_% (163). Once a packet has been prepared and is ready for transmission by video encoder 2 (152), video encoder 2 may increment inst_ppf, which is number of packets per frame in the current frame (154). In some cases, inst_ppf indicates the number of RTP packets in the frame. inst_ppf is further incremented for each packet within the frame until a final packet indicates the end of the frame (156). At this point, video encoder 2 is able to calculate (158) an updated value of avg_norm_ppf as follows:

$$\text{avg\_norm\_ppf} = (1-\alpha) \times \text{avg\_norm\_ppf} + (\alpha \times \text{inst\_ppf}) \times$$
$$(50 \text{ kbps} / \text{target\_encode\_rate}) \times (\text{Current\_Frame\_Rate} / 10 \text{ fps}),$$

wherein it may be assumed, in this particular example, that the target encode rate is normalized with respect to a predefined value of 50 kbps, and that the current frame rate is normalized with respect to a predefined value of 10 fps. These predefined values are used in certain example scenarios only, and may have various different values in different configurations. The value of inst_ppf can then be reset to zero for the next frame (160). As shown, the value of avg_norm_ppf is based upon the values of inst_ppf, target_encode_rate, and Current_Frame_Rate (which is the frame rate of the current frame). As shown in FIG. 6, this value of avg_norm_ppf may then be used to calculate a value of est_ppf.

In one aspect, the value of est_ppf (estimated packets per frame) may be calculated as follows:

$$\text{est\_ppf} = \text{avg\_norm\_ppf} \times (\text{target\_enc\_rate}/50 \text{ kbps}) \times$$
$$(10 \text{ fps}/\text{Current\_Frame\_Rate}),$$

where, in this example, the target encode rate is normalized with respect to a predefined value of 50 kbps, and that the current frame rate is normalized with respect to a predefined value of 10 fps (166). The predefined values may be optimized, and may have different values in various different configurations. The target encode rate (target_enc_rate) may be provided as one input parameter to the equation, and the value of Intra_MB_% from the base algorithm shown in FIG. 5 may be provided as another (164). In one aspect, the target encode rate, target_enc_rate, may comprise an adjustable parameter that may be tuned based upon, for example, the type of application that is being executed by video encoder 2. In one aspect, the target encode rate may be tuned based upon a dynamic rate adaptation algorithm, where video encoder 2 adapts its rate to network conditions.

Rate adaptation module 10 of video encoder 2 may set the value of PER (packet error rate) equal to the value of fraction_lost that is contained within an RTCP Receiver Report sent by video decoder 20, which, as described above, indicates the fraction of packets that have been lost by video decoder 20 since the last Receiver Report was sent (168). Rate adaptation module 10 may then calculate an updated value of Target_Err_Pr, which is the target probability that there will still be an error in the image after a single intra-refresh sequence, as follows (170):

$$\text{Target\_Err\_Pr} = \text{Max}\{\text{Target\_Err\_Pr}, \text{est\_ppf} \times \text{PER}\}.$$

After making this calculation, rate adaptation module 10 is capable of calculating an updated, or modified, value of Intra_MB_% based upon an initial value of Intra_MB_% as determined by the method, or base algorithm, shown in FIG. 5. This initial value of Intra_MB_% as determined by the method of FIG. 5 is indicated as Intra_MB_% from Base algo (such as in FIG. 6, where the base algorithm is the one shown in FIG. 5). The updated value of Intra_MB_% may be calculated (172) as follows:

$$\text{Min}\{\text{Max\_Intra\_MB\_\%}, \text{Max}\{\beta \times 100\% \times \log(1-\text{PER}) \times$$
$$\text{est\_ppf}/\log(1-\text{Target\_Err\_pr}), \text{Intra\_MB\_\% from}$$
$$\text{Base Algorithm}\}\}.$$

This updated value of Intra_MB_% may then be used by the base algorithm shown in FIG. 5, when rate adaptation module 10 intra-codes macro-blocks within frames of a sequence according to this updated value of Intra_MB_% (174).

The method shown in FIG. 6 calculates an updated value of Intra_MB_% to help video encoder 2 limit the probability of having uncorrected errors after one intra-refresh sequence of intra-coded macro-blocks within the frame sequence. As a result, the updated, or modified, value of Intra_MB_% will typically be an increased value, such that intra-refreshing of macro-blocks occurs more quickly, and in fewer frames within a sequence. In obtaining the values and using the calculations shown in FIG. 6, it may, in some cases, be assumed that every slice of a frame (where one slice may contain one or more macro-blocks) contains at least one intra-coded macro-block.

Using this assumption, it may further be assumed that any packet loss during an entire intra-refreshed frame sequence (have intra-coded macro-blocks refreshed at a rate of Intra_MB_%) may cause errors in some macro-blocks because certain intra-coded macro-blocks may be lost. These assumptions may comprise a conservative assumption about how quickly to intra-refresh a frame sequence. Assuming that the probability of packet errors is distributed throughout the frame sequence, all packets throughout the sequence may have an equal probability of causing uncorrected errors. Thus, the probability of there being no error after one intra-refreshed frame sequence may be equal to $(1-PER)^P$, where P is the number of packets in the entire frame sequence. Therefore, the total number of packets in an intra-refresh sequence may be limited to less than $$\log(1-Target\_Err\_Pr)/\log(1-PER).$$

The number of packets in an intra-refreshed (IR) frame sequence may then be calculated as frames in IR sequence×avg # packets per frame during IR sequence, where # frames in IR sequence=100%/Intra_MB_%.

As a result, the estimated average number of packets per frame during an IR sequence may be calculated as $$est\_ppf=Avg\_norm\_ppf \times (target\_enc\_rate/50\ kbps) \times (10\ fps/Current\_Frame\_Rate).$$

Combining these results provides the following formula with respect to the modified value of Intra_MB_% that is determined by the method shown in FIG. 6:

$$\log(1-Target\_Err\_Pr)/\log(1-PER) >= (100\%/Intra\_MB\_\%) \times est\_ppf.$$

FIG. 7 is a flow diagram of a method that may be performed by rate adaptation module 10 of video encoder 2 (FIG. 1) to calculate a packet error rate (PER) upon receipt of a GNACK message, according to one aspect. As described in reference to the method of FIG. 6 to calculate a modified value of Intra_MB_%, a value of PER was selected and set equal to the value of the fraction_lost parameter included within a Receiver Report sent by video decoder 20. FIG. 7 shows a method that may be used by rate adaptation module 10 to obtain a modified value of PER based upon the receipt of a GNACK.

As shown in FIG. 7, rate adaptation module 10 is capable of calculating a value of a parameter GNACK_PER based on the number of packets indicated in a received GNACK message (180). The GNACK is sent from video decoder 20. Video decoder 20 may determine the number of packets within one or more frames have errors (e.g., have been lost), and may indicate this number within the GNACK. In addition, within the GNACK, video decoder 20 may identify the specific packets, by sequence number, that have errors. In one aspect, these packet sequence numbers are initially determined by video encoder 2 when the packets are first sent to video decoder 20 via network 16.

Upon receipt of the GNACK, rate adaptation module 10 may compare the value of GNACK_PER with the value of fraction_lost that was included within the prior RTCP Receiver Report sent from video decoder 20 (182). If GNACK_PER is greater than, or equal to, fraction_lost, then rate adaptation module 10 sets the value of PER equal to GNACK_PER (184). If, however, GNACK_PER is less than fraction_lost, then rate adaptation module 10 sets the value of PER equal to the value of fraction_lost from the last Receiver Report (186).

Thus, as can be seen from the method of FIG. 7, rate adaptation module 10 selects a value of the packet error rate, PER, as the greater of GNACK_PER and fraction_lost. By selecting the greater of these two values, rate adaptation module 10 uses a higher value of PER when calculating the modified intra-refresh rate, Intra-MB_%, within the method of FIG. 6. In this aspect, rate adaptation module 10 increases Intra-MB_% when a higher volume of packet errors are indicated, such as by the fraction_lost parameter or by a GNACK message.

FIG. 8 is a flow diagram illustrating a method that may be performed by rate adaptation module 10 of video encoder 2 (FIG. 1) to determine an updated intra-refresh rate based upon a receipt of one or more GNACK messages from video decoder 20 that may each include packet sequence numbers, according to one aspect. By performing the method of FIG. 8, video encoder 2 may try and limit the total time that a user of video decoder 20 may perceive an error. Rate adaptation module 10 of video encoder 2 may use larger values of Intra_MB_% for older errors, such that these older errors may be corrected more quickly.

Rate adaptation module 10 may maintain a mapping of RTP packet sequence numbers to points in time, or timestamps, at which point the packets were sent from video encoder 2 (190). For example, video encoder 2 may send a first packet having a first sequence number at a first point in time (e.g., 100 ms), and may send a second packet having a second sequence number at a second point in time (e.g., 110 ms). Rate adaptation module 10 may keep a mapping of the sequence numbers-to-timestamps for each of these two packets, as well as any other packets that are sent from video encoder 2 to video decoder 20.

When video encoder 2 receives a GNACK from video decoder 20, indicating that one or more packets have an error (e.g., have been lost), video encoder 2 is capable of determining the sequence numbers of each of the packets identified within the GNACK. For example, if the GNACK indicates that four different packets have errors, video encoder 2 is capable of determining the RTP sequence numbers of each of these four packets. These sequence numbers may be associated with these four packets, and included within the GNACK. (As described previously, these RTP sequence numbers are the sequence numbers originally assigned to the packets when they were first sent by video encoder 2 to video decoder 20. In one aspect, the sequence numbers are assigned by video encoder 2 in ascending order for packets that are sequentially sent to video decoder 20.)

Upon determination of the sequence numbers of the packets identified by the received GNACK, video encoder 2 may the determine (192) the earliest, or smallest, sequence number for an identified packet (RTP_SN) that is greater than the sequence number of the first packet of the last intra-refreshed frame sequence containing intra-coded macro-blocks (RTP_SN_Last_IR_Sequence), or RTP_SN>RTP_SN_Last_IR_Sequence.

Video encoder 2 uses its mapping information to determine the timestamp for the packet identified within the GNACK having this earliest sequence number of RTP_SN. This timestamp corresponds to the point in time at which video encoder 2 originally sent this packet having sequence number RTP_SN to video decoder 20. This timestamp is therefore based upon the clock maintained by video encoder 2. Video encoder 2 compares this timestamp (TS_of_earliest_GNACK_RTP_SN) to the current time (current_time), as indicated by the clock of video encoder 2, and calculates (194) a value of the difference (Time_elapsed) as follows:

Time_elapsed=Current_Time−TS_of_earliest_GNACK_RTP_SN.

The value of the Time_elapsed parameter indicates the period of time that has elapsed since the packet having sequence number RTP_SN has been sent by video encoder 2. Rate adaptation module 10 can then modify the value of Intra_MB_% (used for intra-coding macro-blocks in subsequent intra-refreshed sequences) based upon this elapsed time period. Because RTP_SN is the earliest, or smallest, sequence number for an identified packet in the GNACK that is greater than the sequence number of the first packet of the last intra-refreshed frame sequence containing intra-coded macro-blocks, rate adaption module 10 attempts to modify the value of Intra_MB_% to try and correct older errors (which occurred longer ago) more quickly. Typically, rate adaption module 10 will increase the value of Intra_MB_% in these cases, and then use this modified value within the method shown in FIG. 5 (in the Intra_refresh routine).

In one aspect, rate adaptation module 10 may calculate (196) the modified value of Intra_MB_% as follows:

Set Intra_MB_%=Min {Max_Intra_MB_%,100%/
[(Target_Correction_Time−Time_elapsed)×Current_Frame_Rate]}.

As with certain of the formulas or calculations described previously, rate adaptation module 10 may bound the value of Intra_MB_% by Max_Intra_MB_% in certain cases. The value of Max_Intra_MB_% may be configured or adjusted by video encoder 2 or by a user, based upon the type of application executed by, or environment provided, by video encoder 2. In the case above, rate adaptation module 10 also may determine the modified value of Intra_MB_% based, at least in part, upon a difference between Target_Correction_Time and Time_elapsed. The Target_Correction_Time parameter, as described previously, indicates the maximum amount of time after detection of an error by video encoder 2, such as a packet loss, for which the video encoder 2 has to correct the error. In this case, this maximum correction time becomes a targeted maximum amount of time that a receiver sees a propagation of the error. The value of Target_Correction_Time may be configured or changed for purposed of optimization.

In some aspects, video encoder 2 may implement another enhancement for determining a modified value of Intra_MB_% that may be used within the Intra_refresh routine shown in FIG. 5. In these aspects, rate adaptation module 10 may attempt to measure an amount of motion over a past video frame sequence during which Intra_MB_% was used upon detection of one or more packet errors. As described previously in reference to FIG. 5, rate adaptation module 10 may potentially repeat an intra-refresh sequence for a frame sequence one or more times, according to the value of an adjustable parameter Intra_repeat. The value of this parameter may be adjusted based upon detected motion, which may be a function of motion vectors over the frames within a frame sequence.

Rate adaptation module 10 may compare the amount of detected motion to a motion threshold value, which may comprise a value that is configured or adjusted by a user or by video encoder 2. For example, if a higher value of Intra_MB_% is being currently used, video encoder 2 may use a higher threshold value, given that intra-refreshing is occurring at a higher rate. The threshold may apply to motion statistics for an overall frame, or sequence, but may also apply to motion for specific macro-blocks, as well.

If the amount of detected motion is less than this threshold, then rate adaptation module 10 may modify the value of Intra_MB_% to be set equal to the no-loss value (as used in FIG. 5), according to:

Intra_MB_%=Intra_MB_%_No_Loss.

However, if the amount of motion exceeds this threshold, rate adaptation module 10 may repeat the intra-refresh procedure of an entire video frame sequence, and/or may increase the value of Intra_repeat, such that an additional refresh can be performed. The repeating of the intra-refresh sequence may help correct any errors that may be caused by excessive motion within one or more frames.

Figure 9:
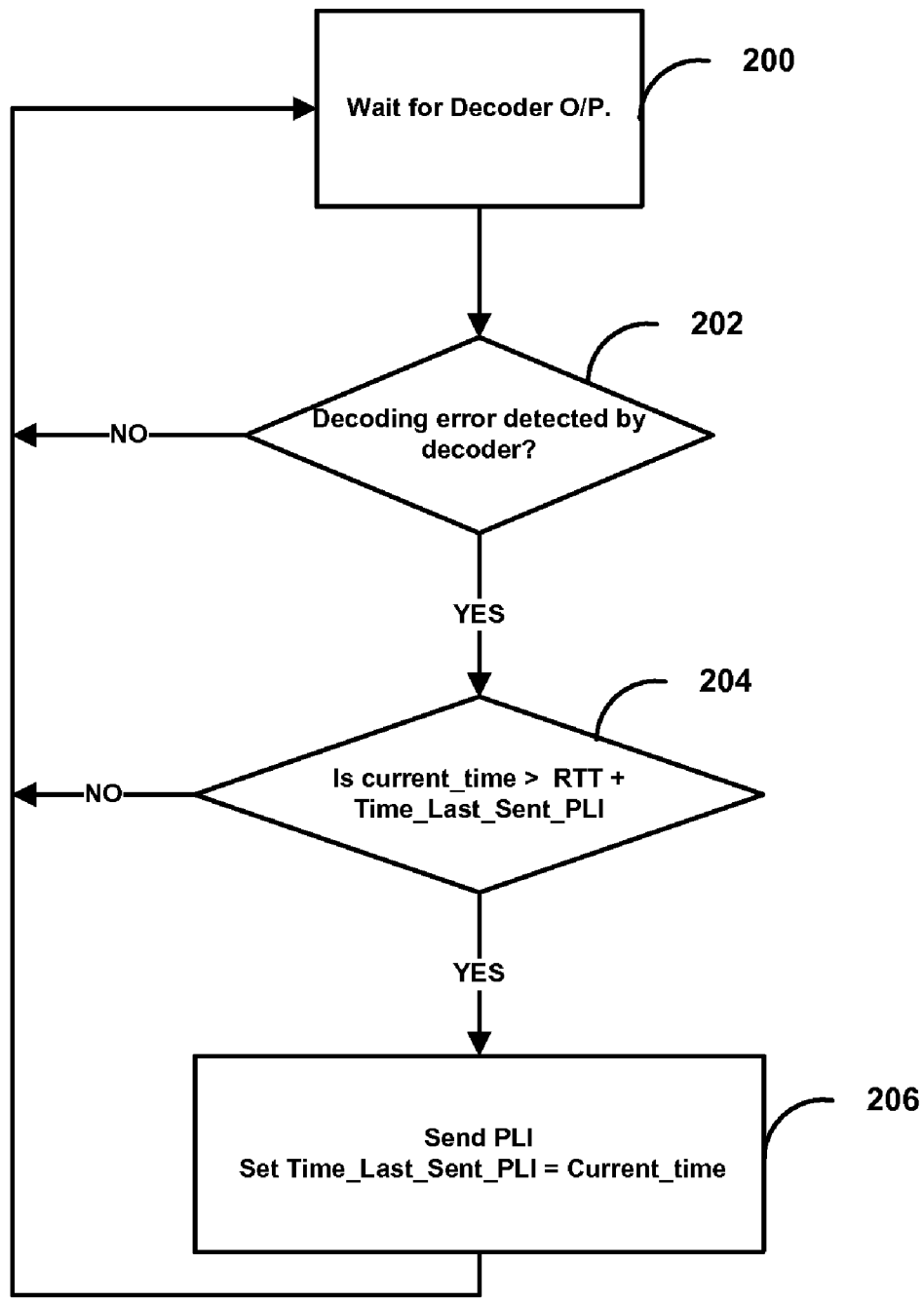
FIG. 9 is a flow diagram illustrating a method that may be performed by a video decoder to determine whether to send a PLI (picture loss indication) message to a video encoder.

FIG. 9 is a flow diagram illustrating a method that may be performed by video decoder 20 (FIG. 1) to determine whether to send a PLI (picture loss indication) message or another indication, such as a General Negative Acknowledgment (GNACK) to video encoder 2, according to one aspect. As described previously, video decoder 20 is capable of sending error (e.g., packet loss) feedback 18 to video encoder 2 upon detection of one or more packet errors by intra-decoder 24 and/or predictive decoder 26. This feedback 18 may include one or more GNACK and/or PLI messages. GNACK messages may specifically identify packets that have errors, while PLI messages may more generally identify decoding errors without necessarily identifying packets.

However, there may be certain disadvantages to sending too many PLI messages, for example, to video encoder 2 over time. For example, video decoder 20 may send a first PLI to video encoder 2, which may trigger rate adaptation module 10 of video encoder 2 to begin an intra-refresh sequence, or to increase the rate of intra-encoding macro-blocks within a frame sequence by increasing the value of Intra_MB_%. If the video decoder 20, shortly thereafter, sends another PLI to video encoder 2 before receiving any of the newly refreshed macro-blocks, video encoder 2 may again, but potentially unnecessarily, increase the value of Intra_MB_%, assuming that there are new, or additional, errors perceived by video decoder 20. In these types of scenarios, PLI messages from video decoder 20 may cross paths with intra-refreshed macro-blocks that are sent by video encoder 2 to correct previously indicated errors. Thus, in some cases, it may be more beneficial for video decoder 20 to perform certain checks before sending repeated PLI messages to video encoder 2 over a short period of time.

According to the method of FIG. 9, video decoder 20 may wait for decoder output from intra-decoder 24 and/or predictive decoder 26 (200). Video decoder 20 may then determine whether any decoding errors were detected by intra-decoder 24 and/or predictive decoder 26 (202). In some cases, video decoder 20 may detect certain errors that are not detected by the RTP layer, such as through analysis of the bit stream of the coded video data. If a decoding error is detected, such as an error in one of the received, coded packets, or even the loss of one or more packets, video decoder 20 may determine the current time (current_time) according to its clock.

Video decoder 20 may also determine, or lookup, a value for RTT, which is the value of the round-trip travel time for data communication between video decoder 20 and video encoder 2. In some cases, the value of RTT may be initially set, or configured, within video decoder 20 as a default value. Video decoder 20, however, is capable of dynamically adjusting, or updating, the value of RTT over time based upon real-time calculations for data communication between video decoder 20 and video encoder 2. For example, video decoder 20 may be able to use information contained within one or more RTCP Receiver and/or Sender Reports in order to measure, or estimate, the value of RTT. In one aspect, video decoder 20 may measure or estimate the value of RTT based upon at least one pair of messages that are exchanged between the video decoder 20 and video encoder 2.

In the example of FIG. 9, video decoder 20 may check to determine (204) whether the following condition is satisfied:

current_time>RTT+Time_Last_Sent_PLI, where is Time_Last_Sent_PLI equal to the time (according to the clock of video decoder 20) that video decoder 20 last sent a PLI to video encoder 2. If the current time is, in fact, greater than the RTT plus Time_Last_Sent_PLI, then video decoder 20 may send another PLI message to video encoder 2, and also set the value of Time_Last_Sent_PLI to the current time, according to the clock of video decoder 20 (206).

If, however, the current time is less than, or equal to, RTT plus Time_Last_Sent_PLI, then video decoder 20 will suppress sending another PLI message to video encoder 2. In these scenarios, video decoder 20 determines that it has previously sent a PLI within one round-trip travel time, and does not need to send another PLI. Video decoder 20 assumes, in these scenarios, that video encoder 2 will begin a new intra-refresh sequence, or may even adjust the value of Intra_MB_%, in response to receiving a prior PLI sent by video decoder 20, and that video decoder 20 will, at the very earliest, begin receiving packets (and macro-blocks) within this refreshed sequence within one round-trip travel time after having sent the prior PLI. Thus, if video decoder 20 identifies any errors within this one round-trip travel time window, it assumes that such errors may be corrected by the intra-refresh sequence that is initiated by video encoder 2 upon receipt of the prior PLI, and that it does not need to send another PLI within this time window. Video decoder 20 may continue to perform the method shown in FIG. 9 for all coded packets received from video encoder 2.

Figure 10:
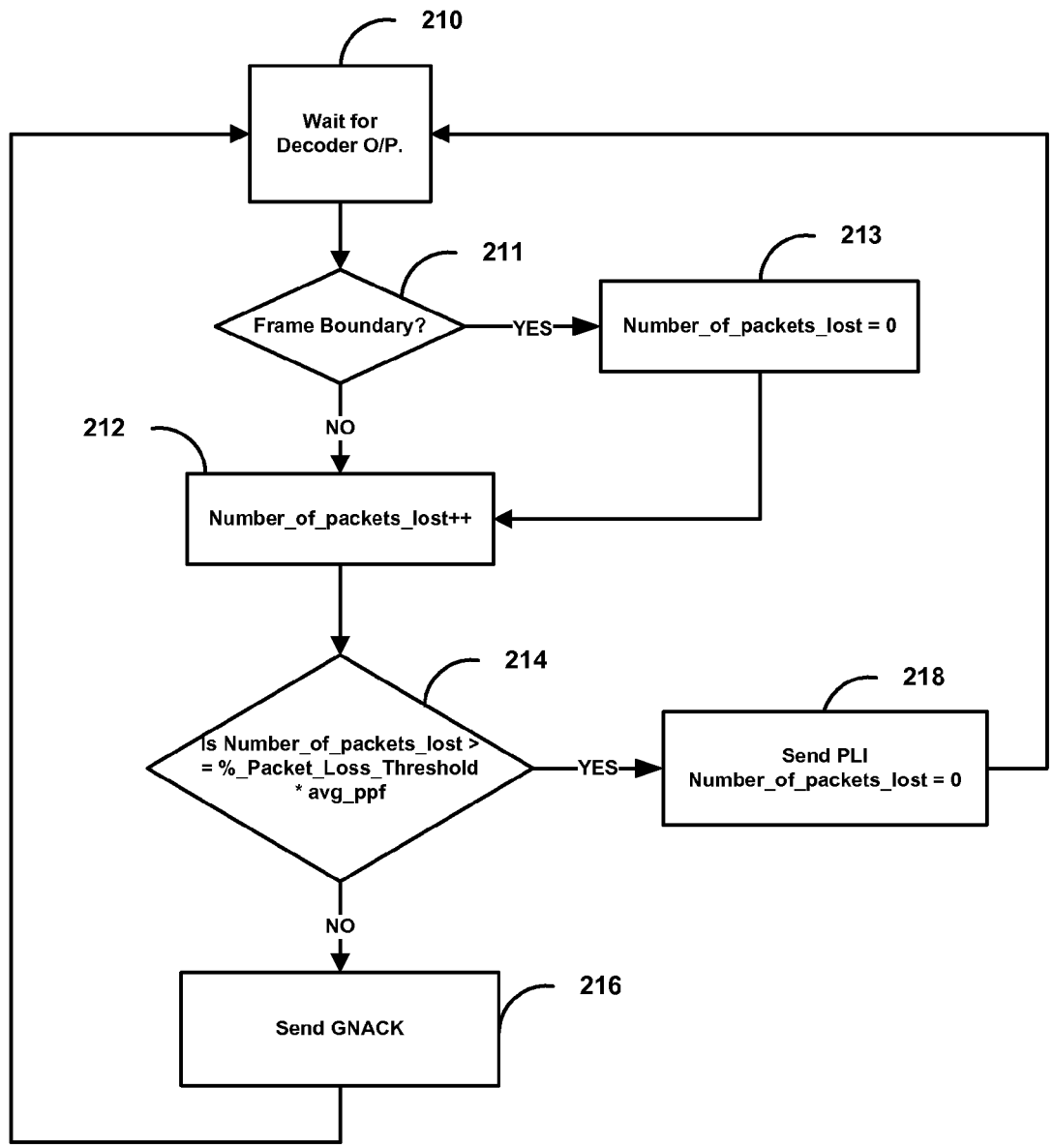
FIG. 10 is a flow diagram of a method that may be performed by a video decoder to determine whether to send a GNACK or a PLI to a video encoder.

FIG. 10 is a flow diagram of a method that may be performed by video decoder 20 (FIG. 1) to determine whether to send a GNACK or a PLI to video encoder 2, according to one aspect. In some cases, video decoder 20 may determine to send a general PLI message to video encoder 2 if, for example, there are a large number of packets that have errors or have been lost since last sending a PLI. In one aspect, video decoder 20 may perform the method shown in FIG. 10 if no prior GNACK or PLI, for example, has been sent within one round-trip travel time, such as shown in FIG. 9.

Thus, as is shown in FIG. 10, video decoder 20 may wait for decoding output (210), and determine whether processing has reached a frame boundary (or whether a new frame has been detected) (211). If so, video decoder 20 may reset the value of a variable called Number_of_packets_lost to zero. As described below, video decoder 20 uses the value of this variable in determining whether to send a GNACK or a PLI upon detection of packet errors. When a new frame has been detected, video decoder 20 may reset the value of this variable to zero.

Video decoder 20 may identify that a particular packet sent by video encoder 2 has been lost, and may then increment the Number_of_packets_lost variable (212). Video decoder 20 may then compare the value of Number_of_packets_lost to a packet loss threshold value. This threshold value may comprise an adjustable parameter that may be configured, or tuned, by a user or by video decoder 20. In some instances, the value of this threshold value may depend on the type of device (e.g., type of device for video decoder 20 and/or video encoder 2), and/or the type of application that is executed (e.g., video telephony application, game application).

In one aspect, video decoder 20 may determine (214) whether the following condition is satisfied:

Number_of_packets_lost>=%_Packet_Loss_Threshold)×avg_ppf, where avg_ppf is equal to the average number of packets per frame received by video decoder 20. Video decoder 20 is capable of estimating the value of avg_ppf by continuously determining the number of packets in each frame received by video encoder 2. If there have been a high number of packets lost since last sending a PLI, such that the number of packets lost exceeds the threshold value (which may, as shown above, also be based on avg_ppf), video decoder 20 may send another PLI message to video encoder 2 to initiate a full intra-refresh sequence (218). Video decoder 20 may also reset the value of Number_of_packets_lost to zero. In one aspect, prior to sending the PLI, video decoder 20 may also perform the method shown in FIG. 9 to determine whether a prior PLI has already been sent within one round-trip time window, and may refrain from sending another PLI when such is the case, as was previously described.

If, however, video decoder 20 determines that the number of packets lost since transmission of the last PLI does not exceed the threshold, video decoder 20 may send a GNACK, rather than a PLI, to video encoder 2 (216). The GNACK may identify specific packets that have errors (or that were lost). Video encoder 2 may then, in some cases, use the sequence numbers associated with the packets identified in the GNACK to perform an enhanced method of updating the intra-refresh rate, such as the method shown in FIG. 8.

In view of the description above and the methods shown in FIGS. 9-10, a video decoder, such as video decoder 20, may, in one aspect, detect at least one error associated with coded video data sent from a video encoder, such as video encoder 2. Video decoder 20 may determine a round-trip travel time for data communication between video decoder 20 and video encoder 2, determine a last-sent time at which video decoder 20 last sent video encoder 2 a feedback message indicating a previous error that was detected by video decoder 20, and compare a current time to a sum of the last-sent time and the round-trip travel time. Based upon the comparing, video decoder 20 may determine whether to send video encoder 2 a second feedback message indicating the at least one error detected by video decoder 20.

In some cases, video decoder 20 may send the second feedback message if the current time exceeds the sum of the last-sent time and the round-trip travel time, and may set the last-sent time equal to the current time. Determining the round-trip travel time may include measuring or estimating the round-trip travel time based upon at least one message that is exchanged between video decoder 20 and video encoder 2. In some cases, video decoder 20 may receive the coded video data from video encoder 2, and may detect the at least one error at least by detecting at least one decoding error upon decoding of the coded video data by the video decoder.

In one aspect, video decoder 20 may detect the at least one error at least by detecting a packet loss. Upon detecting the packet loss, video decoder 20 may increment a count of lost packets, compare the count of lost packets to a threshold, and send the second feedback message to video encoder 2 if the count of lost packets exceeds the threshold and if the current time exceeds the sum of the last-sent time and the round-trip travel time. If the count of lost packets does not exceed the threshold, video decoder 20 may send another type of feedback message indicating the packet loss to video encoder 2.

In some cases, upon sending the second feedback message to video encoder 2, video decoder 2 may set the count of lost packets equal to zero. The threshold may be based, at least in part, upon a packet loss threshold and an average number of packets per frame.

The techniques described in this disclosure may be implemented within one or more of a general purpose microprocessor, digital signal processor (DSP), application specific integrated circuit (ASIC), field programmable gate array (FPGA), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware and/or software. Accordingly, the representation of features as components, units or modules is intended to highlight particular functional features for ease of illustration, and does not necessarily require realization of such features by separate hardware or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-media applications and devices. In some aspects, for example, such components may form part of a mobile device, such as a wireless communication device handset.

If implemented in software, the techniques may be realized at least in part by a computer-readable data storage medium comprising code with instructions that, when executed by one or more processors, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media.

The techniques additionally, or alternatively, may be realized at least in part by a computer-readable communication medium that carries or communicates code in the form of instructions or data structures and that can be accessed, read, and/or executed by one or more processors. Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method comprising:
receiving feedback from a video decoder that indicates an error associated with coded video data, wherein the feedback identifies one or more lost packets in the coded video data that were not received by the video decoder;
calculating an elapsed time based on a difference between a current time and a time at which one of the identified lost packets was previously sent to the video decoder; and
upon receipt of the feedback, determining a rate for intra-coding a specified number of segments of video data for each video unit within a sequence of video units based at least in part on the elapsed time, wherein an intra-coding of segments of video data within one video unit is independent of a coding of segments of video data within other video units within the sequence.

2. The method of claim 1, wherein each segment of video data comprises one or more blocks of video data, and wherein each video unit within the sequence of video units comprises one or more frames of video data.

3. The method of claim 1, wherein determining the rate comprises determining the rate based, at least in part, on a target correction time for correcting errors across one or more video units within the sequence.

4. The method of claim 1, wherein the feedback comprises at least one of a picture loss indication (PLI) and a general negative acknowledgment (GNACK).

5. The method of claim 4, wherein the feedback comprises the GNACK, wherein the GNACK indicates a number of lost packets, and wherein determining the rate for intra-coding is based, at least in part, on the number of lost packets.

6. The method of claim 5, further comprising:
receiving a report from the video decoder indicating a second number of lost packets; and
calculating a packet error rate based upon at least one of the number of lost packets indicated by the GNACK and the second number of lost packets indicated by the report,
wherein determining the rate for intra-coding is based, at least in part, on the packet error rate.

7. The method of claim 6, wherein determining the rate is further based, at least in part, on an estimated number of packets contained within each video unit within the sequence of video units.

8. The method of claim 5, wherein the GNACK identifies each lost packet, and wherein each lost packet identified by the GNACK has a sequence number, and wherein calculating the elapsed time comprises:
determining which lost packet identified by the GNACK has a sequence number that is greater than a sequence number of a first packet of a prior sequence of video units having intra-coded segments; and
calculating the elapsed time based upon a difference between the current time and a time at which the determined lost packet was previously sent to the video decoder.

9. The method of claim 1, further comprising determining whether to repeat the determining of the rate for intra-coding in multiple sequences of video units based upon whether a detected amount of motion across different video units within one sequence of video units exceeds a motion threshold.

10. The method of claim 1, wherein determining the rate further comprises determining the rate based at least in part on a probability of uncorrected errors after one intra-refresh sequence of intra-coded segments within the sequence of video units.

11. The method of claim 1, further comprising intra-coding the specified number of segments using the determined rate.

12. The method of claim 6, wherein the report comprises one of a series of Real-Time Control Protocol (RTCP) receiver reports sent by the video decoder.

13. A non-transitory computer-readable medium containing instructions for causing one or more processors to:
receive feedback from a video decoder that indicates an error associated with coded video data, wherein the feedback identifies one or more lost packets in the coded video data that were not received by the video decoder;
calculate an elapsed time based on a difference between a current time and a time at which one of the identified lost packets was previously sent to the video decoder; and
upon receipt of the feedback, determine a rate for intra-coding a specified number of segments of video data for each video unit within a sequence of video units based at least in part on the elapsed time, wherein an intra-coding of segments of video data within one video unit is independent of a coding of segments of video data within other video units within the sequence.

14. The non-transitory computer-readable medium of claim 13, wherein each segment of video data comprises one or more blocks of video data, and wherein each video unit within the sequence of video units comprises one or more frames of video data.

15. The non-transitory computer-readable medium of claim 13, wherein the rate for intra-coding is based, at least in part, on a target correction time for correcting errors across one or more video units within the sequence.

16. The non-transitory computer-readable medium of claim 13, wherein the feedback comprises at least one of a picture loss indication (PLI) and a general negative acknowledgment (GNACK).

17. The non-transitory computer-readable medium of claim 16, wherein the feedback comprises the GNACK, wherein the GNACK indicates a number of lost packets, and wherein the rate for intra-coding is based, at least in part, on the number of lost packets.

18. The non-transitory computer-readable medium of claim 17, further comprising instructions for causing the one or more processors to:
receive a report from the video decoder indicating a second number of lost packets; and
calculate a packet error rate based upon at least one of the number of lost packets indicated by the GNACK and the second number of lost packets indicated by the report, wherein the rate for intra-coding is based, at least in part, on the packet error rate.

19. The non-transitory computer-readable medium of claim 18, wherein the rate for intra-coding is further based, at least in part, on an estimated number of packets contained within each video unit within the sequence of video units.

20. The non-transitory computer-readable medium of claim 17, wherein the GNACK identifies each lost packet, wherein each lost packet identified by the GNACK has a sequence number, and wherein the instructions for causing the one or more processors to calculate the elapsed time comprise instructions for causing the one or more processors to:
determine which lost packet identified by the GNACK has a sequence number that is greater than a sequence number of a first packet of a prior sequence of video units having intra-coded segments; and
calculate the elapsed time based upon a difference between the current time and a time at which the determined lost packet was previously sent to the video decoder.

21. The non-transitory computer-readable medium of claim 13, further comprising instructions for causing the one or more processors to determine whether to repeat the determining of the rate for intra-coding in multiple sequences of video units based upon whether a detected amount of motion across different video units within one sequence of video units exceeds a motion threshold.

22. The computer-readable medium of claim 13, wherein the instructions for causing the one or more processors to determine the rate comprise instructions for causing the one or more processors to determine the rate further based, at least in part, on a probability of uncorrected errors after one intra-refresh sequence of intra-coded segments within the sequence of video units.

23. The computer-readable medium of claim 13, further comprising instructions for causing the one or more processors to intra-code the specified number of segments using the determined rate.

24. The computer readable medium of claim 18, wherein the report comprises one of a series of Real-Time Control Protocol (RTCP) receiver reports sent by the video decoder.

25. A device comprising:
a storage device; and
one or more processors coupled to the storage device and configured to:
receive feedback from a video decoder that indicates an error associated with coded video data, wherein the feedback identifies one or more lost packets in the coded video data that were not received by the video decoder;
calculate an elapsed time based on a difference between a current time and a time at which one of the identified lost packets was previously sent to the video decoder; and
upon receipt of the feedback, determine a rate for intra-coding a specified number of segments of video data for each video unit within a sequence of video units based at least in part on the elapsed time, wherein an intra-coding of segments of video data within one video unit is independent of a coding of segments of video data within other video units within the sequence.

26. The device of claim 25, wherein each segment of video data comprises one or more blocks of video data, and wherein each video unit within the sequence of video units comprises one or more frames of video data.

27. The device of claim 25, wherein the rate for intra-coding is based, at least in part, on a target correction time for correcting errors across one or more video units within the sequence.

28. The device of claim 25, wherein the feedback comprises at least one of a picture loss indication (PLI) and a general negative acknowledgment (GNACK).

29. The device of claim 28, wherein the feedback comprises the GNACK, wherein the GNACK indicates a number of lost packets, and wherein the rate for intra-coding is based, at least in part, on the number of lost packets.

30. The device of claim 29, wherein the one or more processors are further configured to:
receive a report from the video decoder indicating a second number of lost packets; and
calculate a packet error rate based upon at least one of the number of lost packets indicated by the GNACK and the second number of lost packets indicated by the report, wherein the rate for intra-coding is based, at least in part, on the packet error rate.

31. The device of claim 30, wherein the rate for intra-coding is further based, at least in part, on an estimated number of packets contained within each video unit within the sequence of video units.

32. The device of claim 29, wherein the GNACK identifies each lost packet, wherein each lost packet identified by the GNACK has a sequence number, and wherein the one or more processors are configured to calculate the elapsed time at least by determining which lost packet identified by the GNACK has a sequence number that is greater than a sequence number of a first packet of a prior sequence of video units having intra-coded segments and calculating the elapsed time based upon a difference between the current time and a time at which the determined lost packet was previously sent to the video decoder.

33. The device of claim 25, wherein the one or more processors are further configured to determine whether to repeat the determining of the rate for intra-coding in multiple sequences of video units based upon whether a detected amount of motion across different video units within one sequence of video units exceeds a motion threshold.

34. The device of claim 25, wherein the device comprises a wireless communication device handset.

35. The device of claim 25, wherein the device comprises one or more integrated circuit devices.

36. The device of claim 25, wherein the one or more processors are further configured to determine the rate further based, at least in part, on a probability of uncorrected errors after one intra-refresh sequence of intra-coded segments within the sequence of video units.

37. The device of claim 25, wherein the one or more processors are further configured to intra-code the specified number of segments using the determined rate.

38. The device of claim 30, wherein the report comprises one of a series of Real-Time Control Protocol (RTCP) receiver reports sent by the video decoder.

39. A device comprising:
means for receiving feedback from a video decoder that indicates an error associated with coded video data, wherein the feedback identifies one or more lost packets in the coded video data that were not received by the video decoder;
means for calculating an elapsed time based on a difference between a current time and a time at which one of the identified lost packets was previously sent to the video decoder; and
upon receipt of the feedback, means for determining a rate for intra-coding a specified number of segments of video data for each video unit within a sequence of video units based at least in part on the elapsed time, wherein an intra-coding of segments of video data within one video unit is independent of a coding of segments of video data within other video units within the sequence.

40. The device of claim 39, wherein each segment of video data comprises one or more blocks of video data, and wherein each video unit within the sequence of video units comprises one or more frames of video data.

41. The device of claim 39, wherein the rate for intra-coding is based, at least in part, on a target correction time for correcting errors across one or more video units within the sequence.

42. The device of claim 39, wherein the feedback comprises at least one of a picture loss indication (PLI) and a general negative acknowledgment (GNACK).

43. The device of claim 42, wherein the feedback comprises the GNACK, wherein the GNACK indicates a number of lost packets, and wherein the rate for intra-coding is based, at least in part, on the number of lost packets.

44. The device of claim 43, further comprising:
means for receiving a report from the video decoder indicating a second number of lost packets; and
means for calculating a packet error rate based upon at least one of the number of lost packets indicated by the GNACK and the second number of lost packets indicated by the report,
wherein the rate for intra-coding is based, at least in part, on the packet error rate.

45. The device of claim 44, wherein the rate for intra-coding is further based, at least in part, on an estimated number of packets contained within each video unit within the sequence of video units.

46. The device of claim 43, wherein the GNACK identifies each lost packet, wherein each lost packet identified by the GNACK has a sequence number, and wherein the means for calculating the elapsed time comprises:
means for determining which lost packet identified by the GNACK has a sequence number that is greater than a sequence number of a first packet of a prior sequence of video units having intra-coded segments; and
means for calculating the elapsed time based upon a difference between the current time and a time at which the determined lost packet was previously sent to the video decoder.

47. The device of claim 39, further comprising means for determining whether to repeat the determining of the rate for intra-coding in multiple sequences of video units based upon whether a detected amount of motion across different video units within one sequence of video units exceeds a motion threshold.

48. The device of claim 39, wherein the means for determining comprises means for determining the rate further based, at least in part, on a probability of uncorrected errors after one intra-refresh sequence of intra-coded segments within the sequence of video units.

49. The device of claim 39, further comprising means for intra-coding the specified number of segments using the determined rate.

50. The device of claim 44, wherein the report comprises one of a series of Real-Time Control Protocol (RTCP) receiver reports sent by the video decoder.

* * * * *